US008075115B2

(12) United States Patent
Ishizawa et al.

(10) Patent No.: US 8,075,115 B2
(45) Date of Patent: Dec. 13, 2011

(54) MOUNTABLE APPARATUS AND BOARD HAVING AN INSTALLATION STATUS NOTIFIER

(75) Inventors: Taku Ishizawa, Shiojiri (JP); Satoshi Shinada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 12/401,378

(22) Filed: Mar. 10, 2009

(65) Prior Publication Data

US 2009/0237439 A1 Sep. 24, 2009

(30) Foreign Application Priority Data

Mar. 13, 2008 (JP) ................................ 2008-063581
Mar. 6, 2009 (JP) ................................ 2009-053449

(51) Int. Cl.
*B41J 2/175* (2006.01)
*G06F 13/00* (2006.01)

(52) U.S. Cl. ............... 347/86; 347/5; 711/115; 711/152

(58) Field of Classification Search ..................... 347/86
See application file for complete search history.

(56) References Cited

U.S. PATENT DOCUMENTS

| | | | | |
|---|---|---|---|---|
| 5,860,363 | A | 1/1999 | Childers et al. | |
| 5,974,513 | A * | 10/1999 | Matsuo et al. | 711/115 |
| 2002/0112878 | A1 * | 8/2002 | Ishizawa et al. | 174/250 |
| 2002/0191038 | A1 * | 12/2002 | Tsuji | 347/5 |
| 2007/0149044 | A1 * | 6/2007 | Asauchi | 439/534 |
| 2009/0153610 | A1 * | 6/2009 | Kosugi | 347/19 |

FOREIGN PATENT DOCUMENTS

| | | |
|---|---|---|
| JP | 08-2649 | 1/1996 |
| JP | 10-202900 A | 8/1998 |
| JP | 2004-098564 A | 4/2004 |

* cited by examiner

*Primary Examiner* — Shelby Fidler

(74) *Attorney, Agent, or Firm* — Stroock & Stroock & Lavan LLP

(57) ABSTRACT

A mountable apparatus, which is adapted for installation in a liquid jetting device when delivering a liquid contained in a liquid container that contains a liquid to the liquid jetting device via a liquid delivery tube connected to the liquid container, includes an installation status notifier portion. In an installed state wherein the mountable apparatus is installed in the liquid jetting device, the installation status notifier portion is able to make the liquid jetting device determine that there exists the installed state, and alternatively to make the liquid jetting device determine, even in the installed state, that there exists a non-installed state wherein the mountable apparatus is not installed in the liquid jetting device.

15 Claims, 18 Drawing Sheets

MOUNTABLE APPARATUS AND BOARD HAVING AN INSTALLATION STATUS NOTIFIER

CROSS REFERENCE TO RELATED APPLICATIONS

This application relates to Japanese Patent Applications No. 2008-63581, filed on Mar. 13, 2008 and No. 2009-53449, filed on Mar. 6, 2009, the entire disclosure of which is incorporated by reference.

BACKGROUND

1. Technical Field

The present invention relates to a mountable apparatus, a board, and a method of rewriting liquid information.

2. Description of the Related Art

A typical inkjet printer is equipped with one or more ink containers containing ink. In one known technology relating to ink containers that have on-board memory for recording residual amount information indicating residual ink amount, the ink container is provided with a reset button which is pushed when the ink container has been refilled with ink. According to this technology, when the reset button is pushed, the residual amount information in the memory will be rewritten so as to ensure correct operation of the printer.

However, if residual amount information in the memory should happen to be rewritten while the ink container is installed in the printer, there is a risk that the printer will attempt to access the memory while it is being rewritten. If this should happen, normal read/write operations to the memory will be hampered, creating a risk of data corruption. Such problems are not limited to ink containers, but are common to mountable apparatuses that are adapted to be installed in a liquid jetting device such that a liquid contained in a liquid container is being supplied to the liquid container containing the liquid. Nor are such problems limited to memory rewrite operations, but are common to all manner of operations that carried out with respect to a mountable apparatus or a liquid container while the mountable apparatus is installed in a liquid jetting device.

SUMMARY

It is accordingly one object of the present invention to limit the occurrence of difficulties caused by a liquid jetting device operating at times that a task is being performed in relation to a mountable apparatus or a liquid container, while the mountable apparatus is installed in the liquid jetting device.

A first aspect of the present invention provides a mountable apparatus adapted for installation in a liquid jetting device when delivering a liquid contained in a liquid container that contains a liquid to the liquid jetting device via a liquid delivery tube connected to the liquid container. The mountable apparatus includes an installation status notifier portion that, in an installed state wherein the mountable apparatus is installed in the liquid jetting device, is able to make the liquid jetting device determine that there exists the installed state, and alternatively to make the liquid jetting device determine, even in the installed state, that there exists a non-installed state wherein the mountable apparatus is not installed in the liquid jetting device. According to this aspect, the liquid jetting device can be caused to determine that the mountable apparatus is not installed, even when the mountable apparatus is currently installed in the liquid jetting device. As a result, at times that some task is being performed in relation to the mountable apparatus or liquid container while the mountable apparatus remains installed in the liquid jetting device, the liquid jetting device can be prevented from carrying out operations that are enabled in the installed state, by causing it to determine that a non-installed state exists.

The mountable apparatus according to the first aspect may further include a memory adapted to allow the liquid jetting device to read and write liquid information relating to the liquid while in the installed state; and an information rewriting portion that rewrites the liquid information in the memory independently of a read or write operation by the liquid jetting device, wherein the installation status notifier portion may make the liquid jetting device determine that there exists the non-installed state while the information rewriting portion is rewriting the liquid information. With this arrangement, the liquid jetting device can be prevented from accessing the memory during rewriting of liquid information in the memory independently of the liquid jetting device.

The mountable apparatus according to the first aspect may further include: a memory adapted to allow the liquid jetting device to read and write liquid information relating to the liquid while in the installed state; and an information rewriting portion that rewrites the liquid information in the memory while the installation status notifier portion is making the liquid jetting device determine that there exists the non-installed state. With this arrangement, liquid information in the memory will be rewritten at times that the liquid jetting device has been caused to determine that a non-installed state exists, thereby preventing the liquid jetting device from accessing the memory while liquid information in the memory is being rewritten.

The mountable apparatus according to the first aspect may further include: a determination use terminal adapted to electrically connect to the liquid jetting device in the installed state, and to be used by the liquid jetting device to determine whether there exists the installed state or not; wherein the installation status notifier portion may make the liquid jetting device determine that there exists the non-installed state by bringing the determination use terminal to a high-impedance state. With this arrangement, the liquid jetting device will not be able to ascertain that the determination use terminal is in contact with the device-side terminal that corresponds to the determination use terminal, so the liquid jetting device can be caused to determine that a non-installed state exists.

With the mountable apparatus according to the first aspect, the determination use terminal may include an input terminal that receives from the liquid jetting device an input signal for determining whether there exists the installed state or not; and an output terminal that outputs in response to the input signal a response signal indicating that there exists the installed state, and the installation status notifier portion may make the liquid jetting device determine that there exists the non-installed state by bringing at least either one of the input terminal and the output terminal to a high-impedance state. With this arrangement, the liquid jetting device will not be able to receive a response signal from the output terminal, so the liquid jetting device can be caused to determine that a non-installed state exists.

The mountable apparatus according to the first aspect may further include: a determination use terminal adapted to electrically connect to the liquid jetting device in the installed state, and to be used by the liquid jetting device to determine whether there exists the installed state or not; wherein the installation status notifier portion may make the liquid jetting device determine that there exists the non-installed state by outputting a signal indicating the non-installed state via the determination use terminal. With this arrangement, the liquid jetting device will receive a signal indicative of a non-installed state, so the liquid jetting device can be caused to determine that a non-installed state exists.

With the mountable apparatus according to the first aspect, the determination use terminal may include an input terminal that receives from the liquid jetting device an input signal for determining whether there exists the installed state exists or not; and an output terminal that outputs in response to the input signal a response signal indicating that there exists the installed state; and the installation status notifier portion may make the liquid jetting device determine that there exists the non-installed state by outputting from the output terminal a signal indicating the non-installed state, instead of the response signal. With this arrangement, the liquid jetting device will receive a signal indicative of a non-installed state, so the liquid jetting device can be caused to determine that a non-installed state exists.

The mountable apparatus according to the first aspect may further include: a first terminal adapted to electrically connect to the liquid jetting device in the installed state, wherein the liquid jetting device may be made to determine whether there exists the non-installed state or the non-installed state, depending on whether potential on the first terminal is a prescribed potential or not.

The mountable apparatus according to the first aspect may further include: a second terminal that in the installed state is supplied with the prescribed potential; wherein the installation status notifier portion may be a first switching portion that switches a connection of the first terminal and the second terminal between a state of continuity and a state of non-continuity. With this arrangement, both an installation state notifier portion and a non-installation state notifier portion can be implemented through a simple design.

The mountable apparatus according to the first aspect may further include: an operation receiving portion that receives operations by a user, wherein the information rewriting portion may rewrite the liquid information when a user operation has been received. With this arrangement, liquid information can be rewritten through user operation, independently of the liquid jetting device.

With the mountable apparatus according to the first aspect, the information rewriting portion may rewrite the liquid information when a value of the liquid information has met a prescribed condition. With this arrangement, liquid information can be rewritten automatically, independently of the liquid jetting device.

With the mountable apparatus according to the first aspect, the information rewriting portion may rewrite the liquid information when an update count by the liquid jetting device of the liquid information stored in the memory exceeds a prescribed count. With this arrangement, liquid information can be rewritten automatically, independently of the liquid jetting device.

With the mountable apparatus according to the first aspect, the liquid information may include consumption information identifying a consumed amount of the liquid. With this arrangement, liquid consumption information can be rewritten independently of the liquid jetting device.

The mountable apparatus according to the first aspect may further include: a memory terminal adapted to electrically connect the memory with the liquid jetting device in the installed state; and a second switching portion that switches a connection of the memory and the memory terminal between a state of continuity and a state of non-continuity, wherein the second switching portion may place the connection of the memory and the memory terminal in a state of non-continuity while the information rewriting portion is rewriting the liquid information. With this arrangement, the liquid jetting device can more reliably be prevented from accessing the memory at times that the information rewriting portion is rewriting liquid information.

The mountable apparatus according to the first aspect may further include: a memory adapted to allow the liquid jetting device to read and write liquid information relating to the liquid while in the installed state; and an information rewriting portion that rewrites the liquid information in the memory independently of a read or write operation by the liquid jetting device, wherein the installation status notifier portion may make the liquid jetting device acknowledge the non-installed state during a prescribed time interval that includes an interval in which the information rewriting portion is rewriting the liquid information. With this arrangement, the liquid jetting device can more reliably be prevented from accessing the memory at times that the information rewriting portion is rewriting liquid information.

The mountable apparatus according to the first aspect may further include: a supply hole situated on one side of the mountable apparatus, for supplying the liquid to the liquid jetting device; wherein the operation receiving portion may be disposed to an opposite side from the one side of the mountable apparatus. This arrangement can afford the user greater ease of operation of the operation receiving portion.

A second aspect of the present invention provides a mountable apparatus adapted for installation in a liquid jetting device when delivering a liquid contained in a liquid container that contains a liquid to the liquid jetting device via a liquid delivery tube connected to the liquid container. The mountable apparatus include: a memory; a controller that controls the memory; and a determination use terminal adapted to electrically connect to the liquid jetting device in an installed state wherein the mountable apparatus is installed in the liquid jetting device, and to be used by the liquid jetting device to determine whether there exists the installed state or not; wherein when a prescribed condition is met, the controller brings the determination use terminal to a high-impedance state, and rewrites data stored in the memory. According to this aspect, in the event that a prescribed condition is met, data in the memory will be rewritten while causing the liquid jetting device to determine that a non-installed state exists, so data in the memory will be written safely in the event that the prescribed condition has been met.

A second aspect of the present invention provides a mountable apparatus adapted for installation in a liquid jetting device when delivering a liquid contained in a liquid container that contains a liquid to the liquid jetting device via a liquid delivery tube connected to the liquid container. The mountable apparatus include: a memory; a controller that controls the memory; an operation receiving portion that receives operations by a user; and a determination use terminal adapted to electrically connect to the liquid jetting device in an installed state wherein the mountable apparatus is installed in the liquid jetting device, and to be used by the liquid jetting device to determine whether there exists the installed state or not; wherein when a user operation has been received, the controller brings the determination use terminal to a high-impedance state, and rewrites data stored in the memory. According to this aspect, in the event that a user operation has been received, data in the memory will be rewritten while causing the liquid jetting device to determine that a non-installed state exists, so data in the memory will be written safely in the event that a user operation has been received.

The present invention may be reduced to practice in various different embodiments, for example, a board adapted for installation in a liquid jetting device; a board adapted for mounting on a mountable apparatus; a method of rewriting liquid information relating to a liquid and recorded in a memory of a mountable apparatus that is adapted to supply a liquid jetting device with a liquid contained in a liquid container, while the apparatus is in the installed state in a liquid jetting device; or a method of controlling the aforementioned mountable apparatus or board.

The above and other objects, characterizing features, aspects and advantages of the present invention will be clear from the description of preferred embodiments presented below along with the attached figures.

DETAILED DESCRIPTION OF THE PREFERRED EMBODIMENTS

A. Embodiment 1

Figure 1:
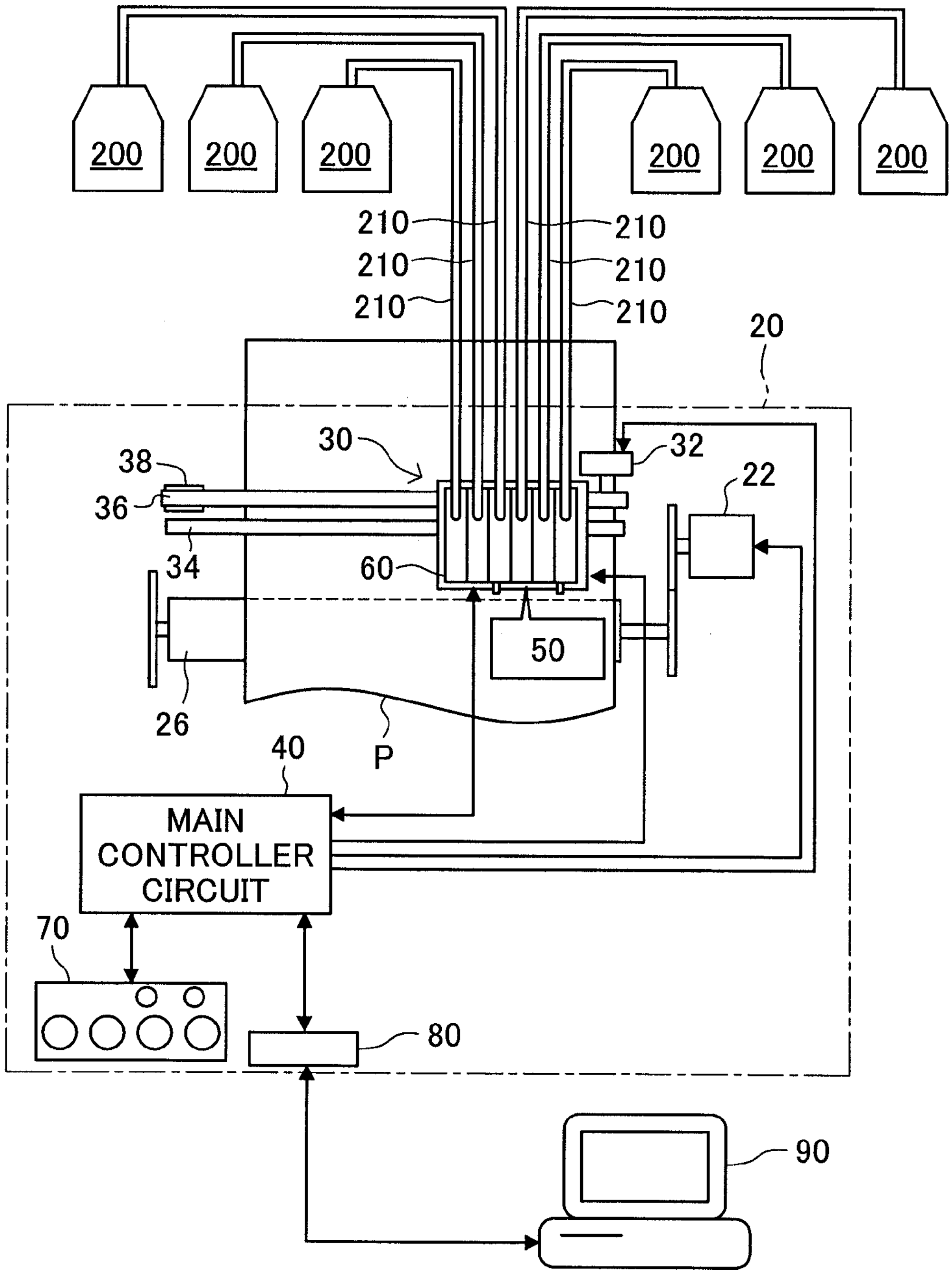
FIG. 1 is an illustration depicting a general configuration of a printing system according to an embodiment of the present invention.

FIG. 1 is an illustration depicting a general configuration of a printing system according to an embodiment of the present invention. The printing system is furnished with a printer 20, a computer 90, and six ink containers 200. The printer 20 is connected to the computer 90 via a connector 80. Each of the six ink containers 200 contains ink of a different color. The six ink containers 200 are respectively connected to the printer 20 by single tubes 210. The tubes 210 provided as the ink delivery tubes are made of flexible material such as rubber or elastomer.

The printer 20 is furnished with a sub-scan feed mechanism, a main scan feed mechanism, a head driving mechanism, and a main controller circuit 40 for controlling these mechanisms. The sub-scan feed mechanism includes a paper feed motor 22 and a platen 26; rotation of the paper feed motor is transmitted to the platen in order to feed paper P in the sub-scanning direction. The main scan feed mechanism includes a carriage motor 32; a pulley 38; a drive belt 36 stretched between the carriage motor and the pulley; and a slide rail 34 disposed parallel to the axis of the platen 26. The slide rail 34 slidably retains a carriage 30 that is affixed to the drive belt 36. Rotation of the carriage motor 32 is transmitted to the carriage 30 via the drive belt 36 whereby the carriage 30 undergoes reciprocating motion along the slide rail 34 in the axial direction of the platen 26 (main scanning direction). The head driving mechanism includes a print head unit 60 that is carried on the carriage 30, and is adapted to drive the print head and eject ink onto the paper P. The print head unit 60 can accommodate detachably installed thereon ink relay cartridges equal in number to the ink containers 200 (six in the present embodiment), as will be discussed later. Also on board the carriage 30 is a carriage circuit 50. The carriage circuit 50 is a circuit that in cooperation with the main controller circuit 40 carries out control relating to ink cartridges or ink relay cartridges 100 that have been installed on the print head unit 60, and hereinbelow will also be referred to as a "sub-controller." The printer 20 is additionally furnished with an operation unit 70 allowing the user to make various printer settings or to check the status of the printer.

Figure 2:
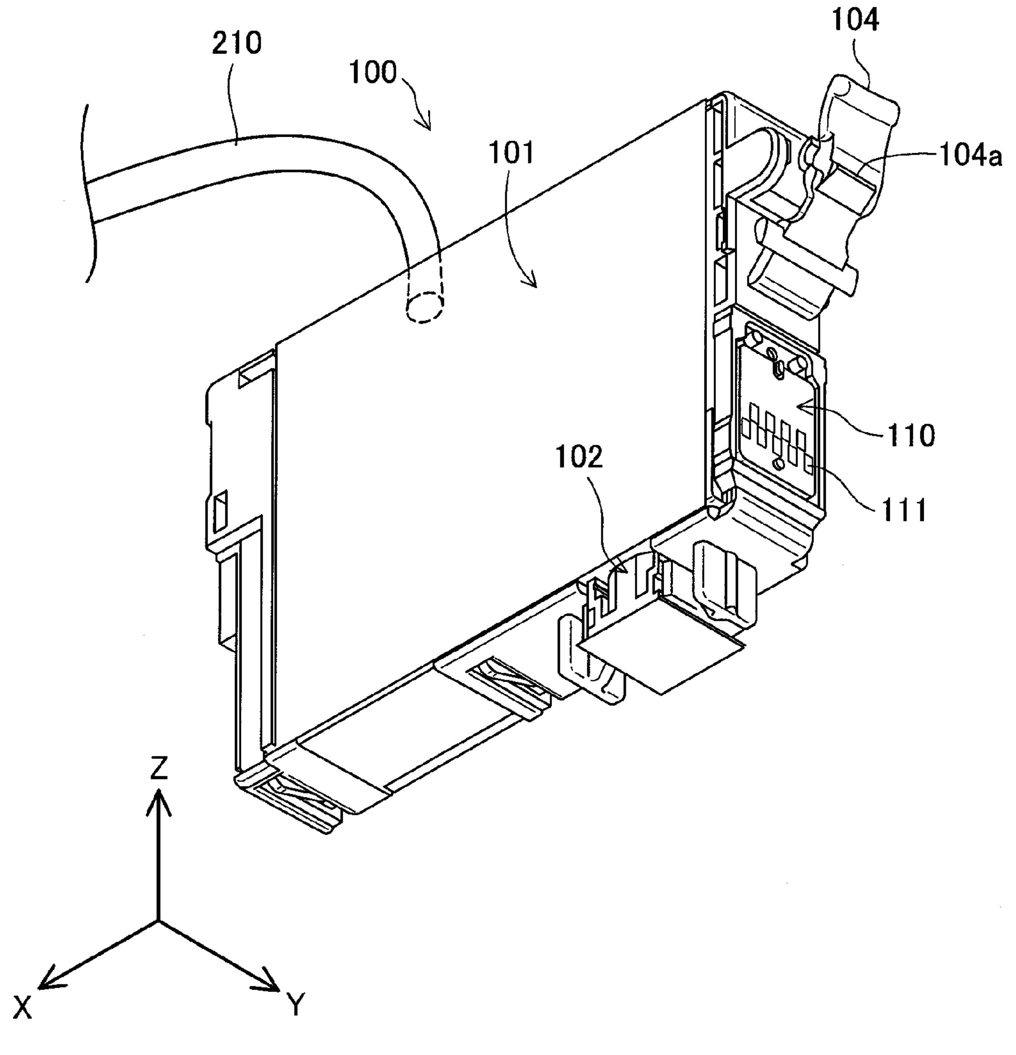
FIG. 2 is a perspective view depicting an external configuration of an ink relay cartridge in Embodiment 1.

FIG. 2 is a perspective view depicting an external configuration of an ink relay cartridge in Embodiment 1. The ink relay cartridge 100 is furnished with a housing 101 containing ink; an ink delivery portion 102; a board 110; and a locking lever 104. The ink delivery portion 102 is provided on the bottom face of the housing 101, and is adapted to deliver ink to the print head unit 60 when installed in the print head unit 60. The aforementioned tubes 210 connect at their printer 20-side end to the top face of the housing 101.

Figure 3:
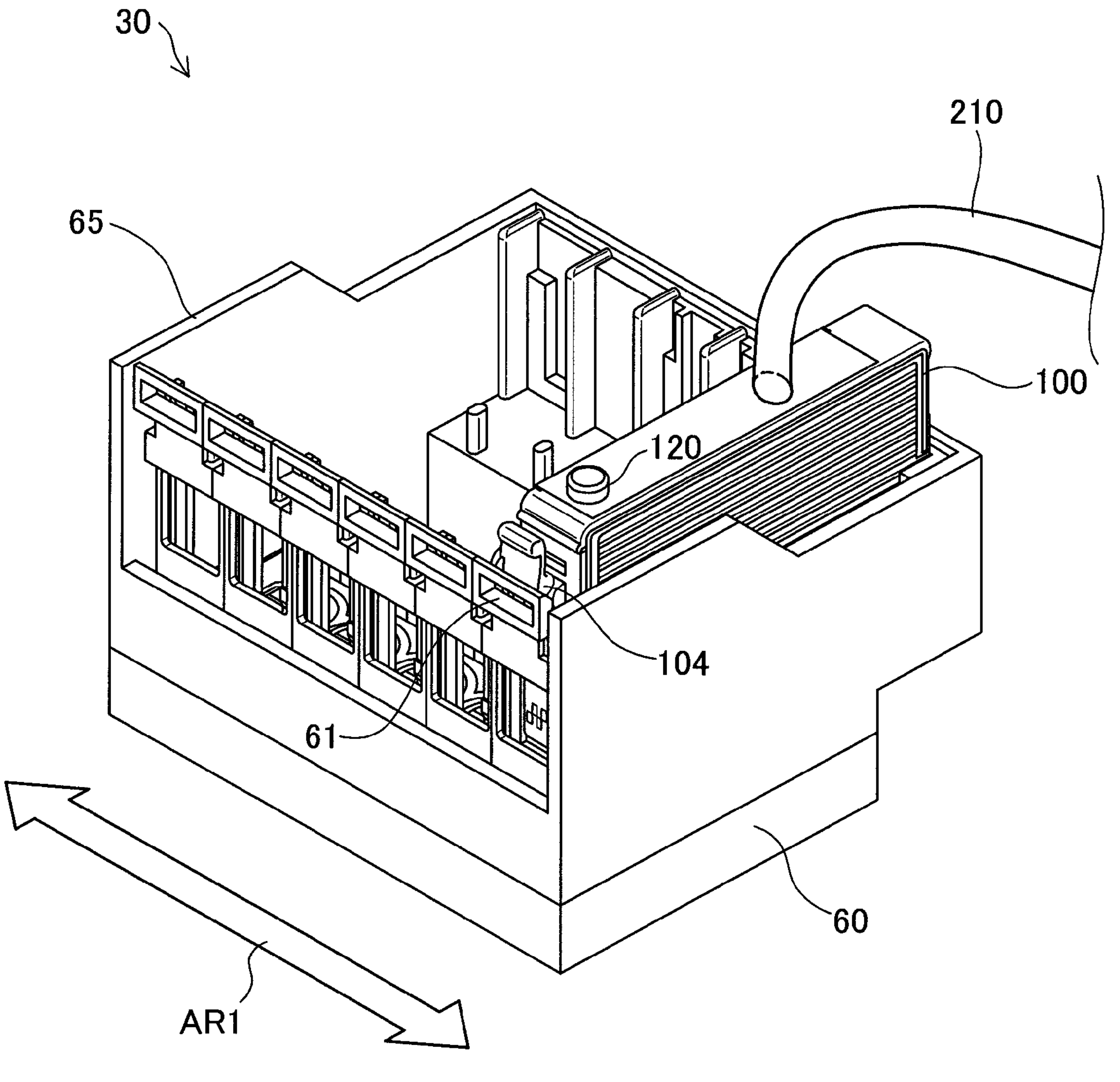
FIG. 3 is a diagram depicting an ink relay cartridge, shown mounted on a carriage.

FIG. 3 is a diagram depicting an ink relay cartridge, shown mounted on a carriage. In the carriage 30, a holder 65 is disposed on top of the print head unit 60; the ink relay cartridges 100 are installed in this holder 65. Once an ink relay cartridge 100 has been installed in the holder 65, a projection **104*a* on the locking lever 104 will engage a recess 61 that has been formed on the holder 65. The ink relay cartridge 100 will thereby be secured in the holder 65. When the printer 20 is carrying out printing, the ink relay cartridge 100 will undergo reciprocating motion in the direction indicated by arrow AR1**.

Figure 4A:
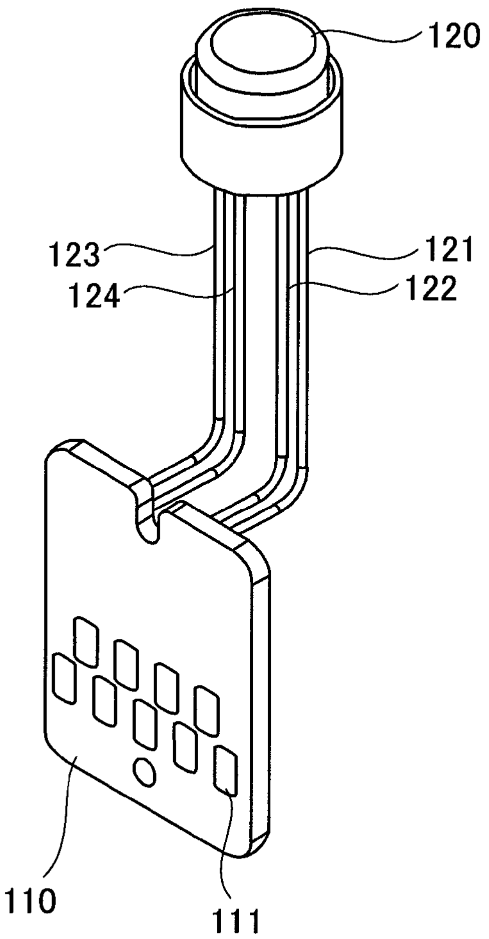
FIGS. 4A and 4B are diagrams depicting a configuration of a board 110.
Figure 4B:
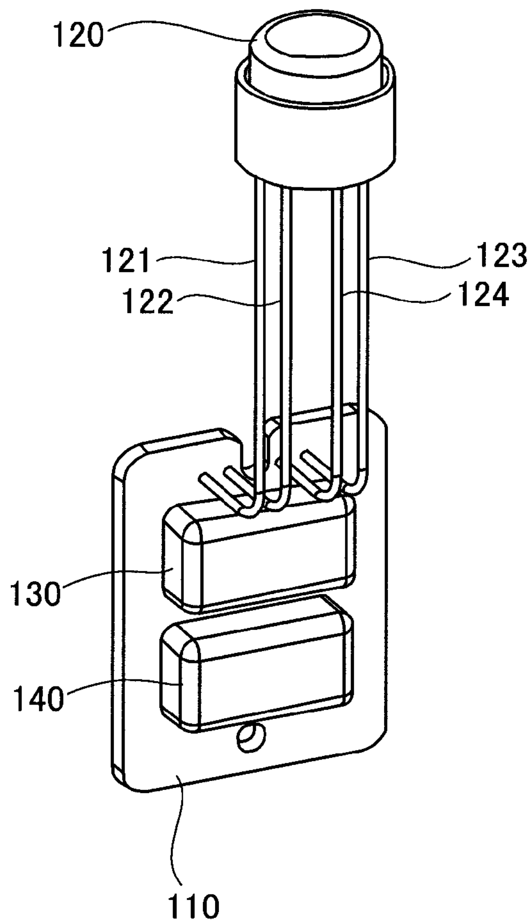

FIG. 4 depicts a configuration of the board 110. Nine terminals 111 are arranged on the front face of the board 110. A controller 130 and a memory 140 are arranged on the back face of the board 110. The controller 130 is composed of a logic circuit, for example. The controller 130 and the memory 140 are electrically connected, allowing the controller 130 to execute control processes of the memory 140, including writing of data to the memory 140 and reading of data from the memory 140. Specifically, it will execute a reset process (discussed later) for example. The memory 140 is a rewritable nonvolatile memory, such as EEPROM (Electronically Erasable and Programmable Read Only Memory) or FeRAM (Ferroelectric Random Access Memory) for example. The controller 130 and the memory 140 may be respectively constituted as different chips which are connected by lines; or constituted as a single chip. Additionally, a reset button 120 is connected to the back face of the board 110 by four lines 121 to 124. As shown in FIG. 3, the reset button 120 is situated on the upper face of the ink relay cartridge 100, that is, on the face thereof on the opposite side from the bottom face where the ink delivery portion 102 is located. While not shown in the drawing, the ink relay cartridge 100 is also furnished with a battery. The battery will supply power to the controller 130 and the memory 140 so that when the reset button 120 is depressed by the user, the controller 130 will carry out rewriting of the memory 140 in the reset process to be discussed later, even if no power is being supplied from the printer 120.

Figure 5:
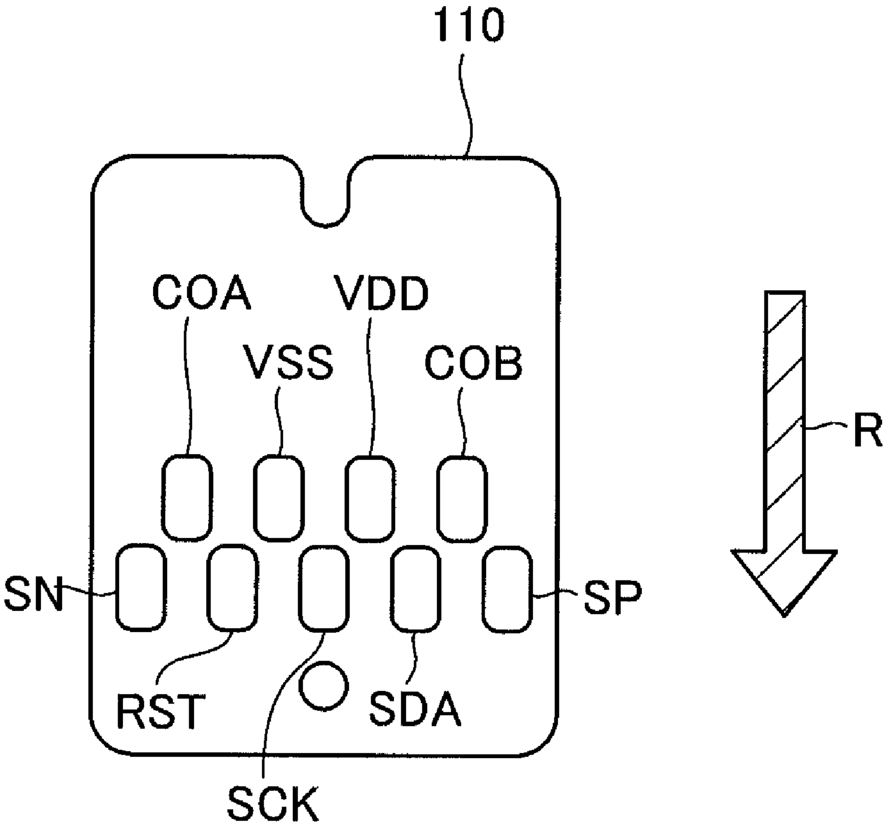
FIG. 5 is a diagram depicting nine terminals on the front face of the board 110.

FIG. 5 is a diagram depicting the nine terminals 111 on the front face of the board 110. The terminals are generally oblong in shape and arranged to form two rows generally perpendicular to the insertion direction R. The insertion direction R indicates the direction of insertion of the ink relay cartridge 100 when installed in the holder 65. Of the two rows, the row lying towards the insertion direction R, i.e. towards lower side in FIG. 5, will be termed the lower row; and the row lying to the opposite side from the insertion direction R, i.e. towards upper side in FIG. 5, will be termed the upper row. The terminals that make up the upper row and the terminals that make up the lower row are arranged differently from one another such that they make a staggered arrangement and that any terminal centers do not line up with one another in the insertion direction R.

Of the terminals 111, the terminals arrayed to form the upper row are, in order from the left side, a first cartridge out terminal COA, a ground terminal VSS, a power supply terminal VDD, and a second cartridge out terminal COB. The terminals arrayed to form the lower row are, in order from the left side, a first sensor driving terminal SN, a reset terminal RST, a clock terminal SCK, a data terminal SDA, and a second sensor driving terminal SP. The electrical configuration of the terminals will be discussed later.

Figure 6:
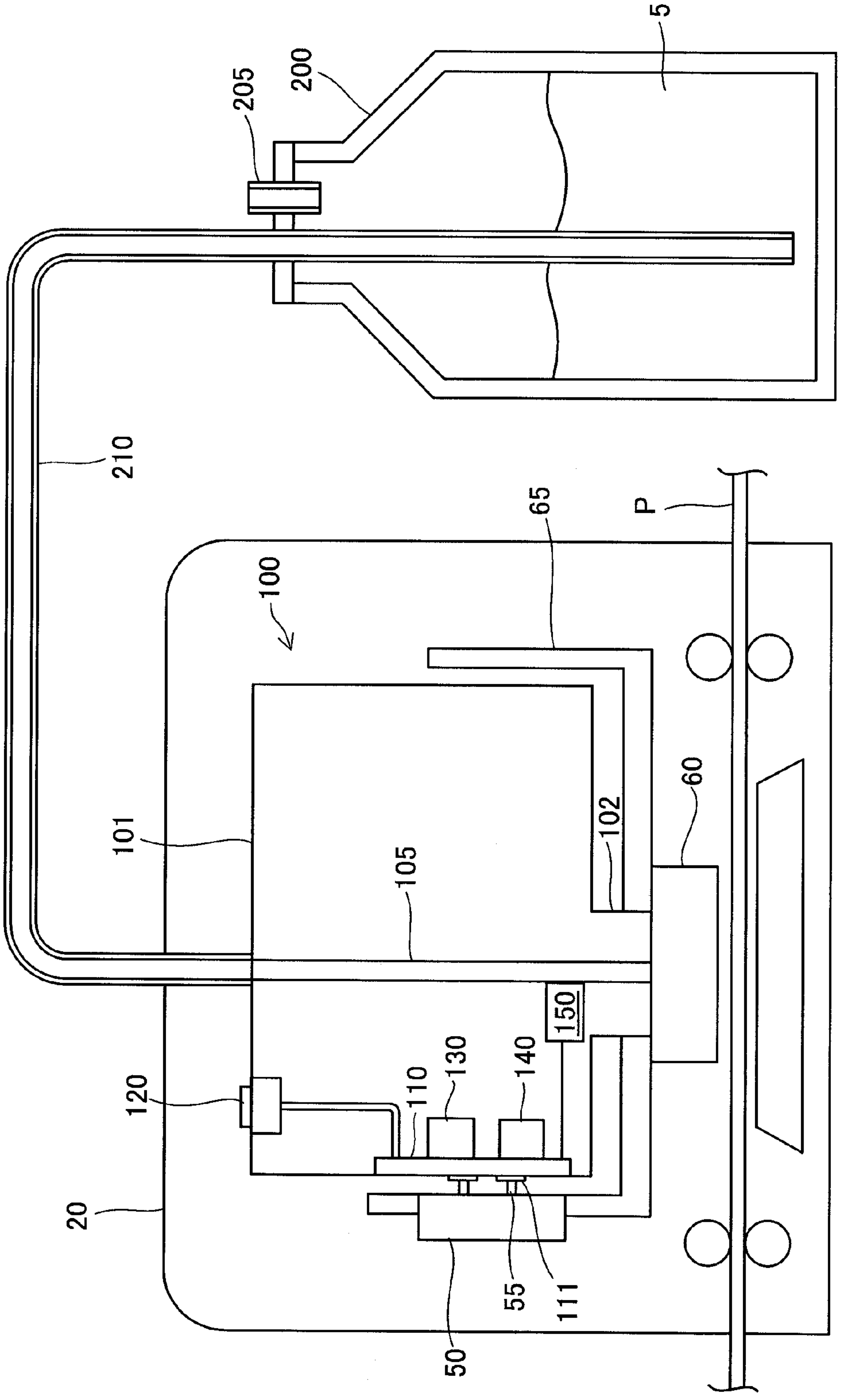
FIG. 6 is an illustration depicting an internal configuration of an ink relay cartridge.

FIG. 6 is an illustration depicting the internal configuration of an ink relay cartridge 100 and an ink container 200. An ink flow channel 105 is formed inside the housing 101 of the ink relay cartridge 100. One end of the ink flow channel 105 connects to the printer 20-side end of the tube 210. The other end of the ink flow channel 105 communicates with the feed hole of the ink delivery portion 102.

The ink container 200 contains a relatively large amount of ink. An outside air vent hole 205 is provided in the cap of the ink container 200. The outside air vent hole 205 communicates at one end with an ink containing chamber 107 inside the ink container 200, and at the other end the outside air vent hole 205 opens to the outside. The printer 20-side end of the tube 210 opens into ink 5 inside the ink container 200.

Ink 5 is delivered to the printer 20 from the feed hole of the ink delivery portion 102 of the ink relay cartridge 100. As the delivered ink 5 is consumed by the printer 20, in the ink container 200, outside air will be drawn into the ink container 200 through the outside air vent hole 205. In this way, in response to consumption of ink 5 by the printer 20, the printer 20 will be supplied with ink 5 from the ink container 200 relayed via the ink relay cartridge 100.

Also provided inside the ink relay cartridge 100 is a sensor 150 disposed in proximity to the ink delivery portion 102. While not depicted in detail here, the sensor 150 includes a cavity that defines part of the ink flow channel 105 in proximity to the ink delivery portion; an oscillating plate that defines part of the wall of the cavity; and a piezoelectric element that is situated on the oscillating plate. By supplying electrical energy to the piezoelectric element, the printer 20 can induce oscillation of the oscillating plate through the agency of the piezoelectric element. Then, by sensing characteristics (frequency, etc.) of residual vibration of the oscillating plate via the piezoelectric element, the printer 20 can sense whether ink in present in the cavity. Specifically, when conditions inside the cavity change from a condition of being filled with ink 5 to a condition of being filled with air due to consumption of the ink 5 contained in the housing 101, the characteristics of residual vibration of the oscillating plate will change. By sensing this change in vibration characteristics via the sensor 150 (piezoelectric element), the inkjet printer can sense whether ink is present in the cavity.

When the ink relay cartridge 100 is installed in the holder 65, the terminals 111 of the board 110 will come into contact with the equivalent number of corresponding printer-side terminals 55. As a result, the board 110 of the ink relay cartridge 100 will be electrically connected to the sub-controller 50 of the printer 20.

Figure 7:
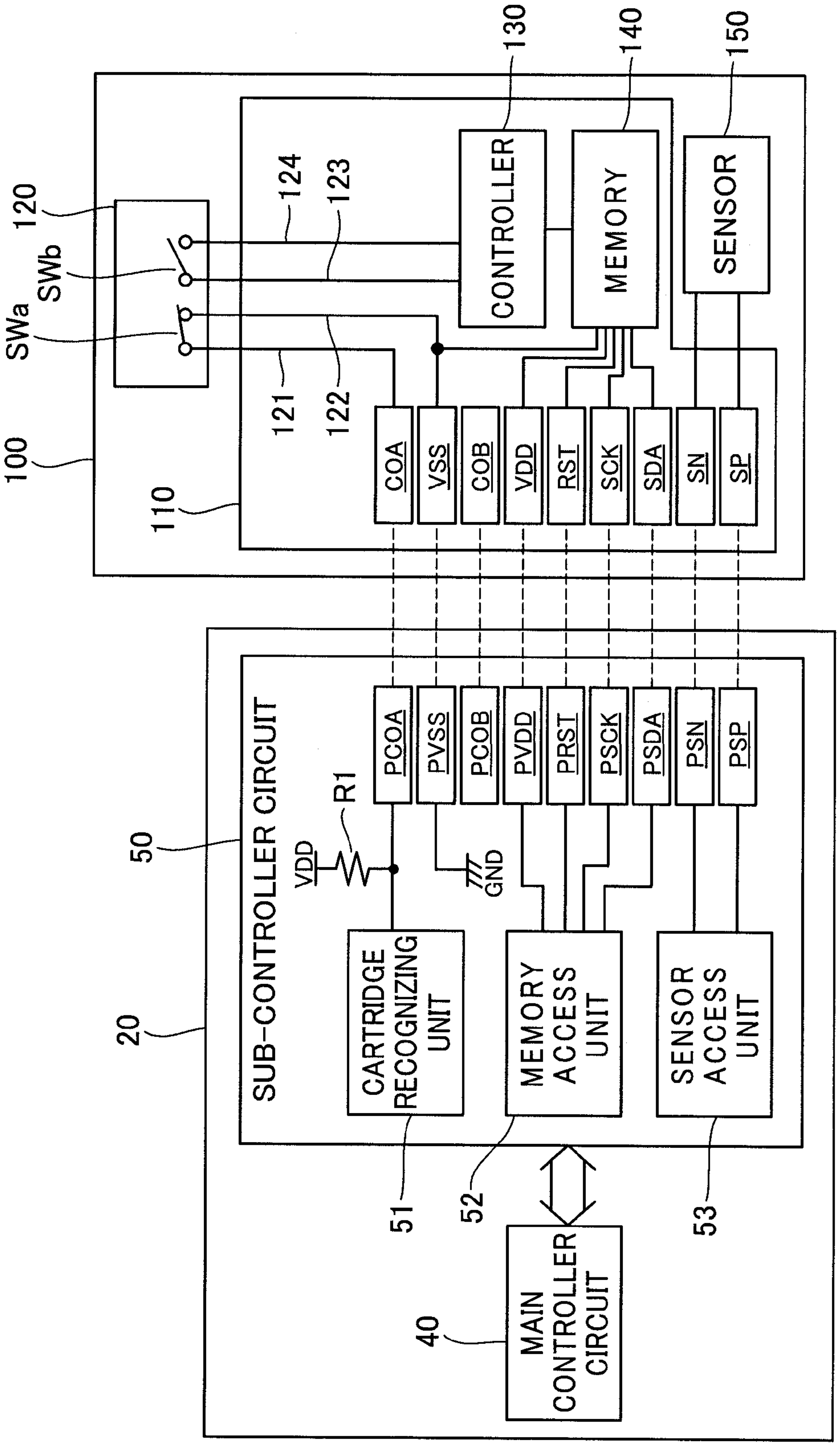
FIG. 7 is a diagram depicting an electrical configuration of an ink relay cartridge and a printer of Embodiment 1.

FIG. 7 is a diagram depicting an electrical configuration of an ink relay cartridge 100 and the printer 20 of Embodiment 1. Five terminals, i.e. the ground terminal VSS, the power supply terminal VDD, the reset terminal RST, the clock terminal CSK, and the data terminal SDA, are respectively connected to the memory 140. The two terminals situated at the opposite ends of the lower row, namely, the first sensor driving terminal SN and the second sensor driving terminal SP, are respectively connected to one electrode and the other electrode of the piezoelectric element of the sensor 150. The first cartridge out terminal COA is connected to a line 121, while the ground terminal VSS is connected to a line 122. In the present embodiment, the second cartridge out terminal COB is not connected to anything.

The reset button 120 includes two switches SWa, SWb. The switch SWa may have any arrangement capable of switching a connection of the first cartridge out terminal COA and the ground terminal VSS between the connected state and the disconnected state. The switch SWb may have any arrangement capable of notifying the controller 130 that the user has pressed the reset button 120. For example, the switch SWa may be a mechanical switch adapted to switch in response to physical movement of the reset button 120 when pressed by the user; or a switch (e.g. a transmission gate) that is electrically controlled by the controller 130 when the latter recognizes that the reset button 120 has been pressed by the user. The switch SWb may be a mechanical switch adapted to switch in response to physical movement of the reset button 120 when pressed by the user; or an electrical switch adapted to sense that the reset button 120 has been pressed by the user, and to alert the controller 130. In the present embodiment, the switches SWa, SWb are described as mechanical switches. The first cartridge out terminal COA and the ground terminal VSS are connected to one another via the line 121, the first switch SWa, and the line 122. Therefore, when the first switch SWa goes ON, a state of continuity will be produced between the first cartridge out terminal COA and the ground terminal VSS. When the first switch SWa goes OFF, a state of non-continuity will be produced between the first cartridge out terminal COA and the ground terminal VSS. The second switch SWb is a switch provided for instructing the controller to perform a reset of the memory 140. When the second switch SWb goes ON, the controller 130 will perform a reset of the memory 140. Reset of the memory will be discussed later.

The sub-controller 50 is able to communicate with the main controller circuit 40 via a bus. The sub-controller 50 is furnished with printer-side terminals, a cartridge recognizing unit 51, a memory access unit 51, and a sensor access unit 53.

Nine printer-side terminals are provided for each single ink relay cartridge 100. With the ink relay cartridge 100 installed in the printer 20, the nine printer-side terminals will respectively contact the nine terminals of the board 110 of the ink relay cartridge 100 (FIG. 5). The respective ink relay cartridges 100 will thereby be electrically connected to the printer 20. In the following description, printer-side terminals corresponding to, or intended for contact with, terminals on the board 110 will be denoted by putting a letter P in front of the symbols for the corresponding terminal of the board 110. For example, the printer-side terminal corresponding to, or intended for contact with, the clock terminal SCK of the board 110 will be denoted as printer-side terminal PSCK.

The printer-side ground terminal PVSS is connected to L level (GND level). The first printer-side cartridge out terminal PCOA is connected to H level (VDD level) via a pull-up resistor R1. Where GND level is 0 V, VDD level will be 3.3 V, for example.

On the basis of the potential of the first printer-side cartridge out terminal PCOA, the cartridge recognizing unit 51 will determine whether the ink relay cartridge 100 is currently installed in the printer 20. If the first printer-side cartridge out terminal PCOA is H level, the cartridge recognizing unit 51 will determine that a non-installed state exists, meaning that the ink relay cartridge 100 is not currently installed. If the PCOA is L level, the cartridge recognizing unit 51 will determine an installed state exists, meaning that the ink relay cartridge 100 is currently installed.

If the ink relay cartridge 100 is actually in the non-installed state, the first printer-side cartridge out terminal PCOA will assume a high-impedance state. Consequently, the first printer-side cartridge out terminal PCOA will be held at H level, and it will be correctly determined that the non-installed state exists.

On the other hand, if the ink relay cartridge 100 is in the installed state, provided that the first switch SWa is in the ON state, the first printer-side cartridge out terminal PCOA will be held at L level, and it will be correctly determined that the installed state exists. In the ink relay cartridge 100, because the first cartridge out terminal COA and the ground terminal VSS are in a state of continuity, the first printer-side cartridge out terminal PCOA will have continuity with the printer-side ground terminal PVSS via the first cartridge out terminal COA and the ground terminal VSS.

Even with the ink relay cartridge 100 in the installed state, if the first switch SWa is in the OFF state, the first printer-side cartridge out terminal PCOA will be held at H level, and it will be determined that the non-installed state exists.

The printer-side power supply terminal PVDD, the printer-side reset terminal PRST, the printer-side clock terminal PSCK, and the printer-side data terminal PSDA are connected to the memory access unit 52. With the ink relay cartridge 100 in the installed state, the memory access unit 52 will be able to access the memory 140 of the ink relay cartridge 100 via these terminals. Specifically, the memory access unit 52 will be able to read residual ink amount information from the memory 140, and to write residual ink amount information to the memory 140. Residual ink amount information is a value that indicates the amount of remaining ink 5 contained in the ink container 200. The initial value of residual ink amount information will correspond, for example, to the amount of ink 5 contained in an ink container 200 of hypothetical size. The main controller circuit 40 of the printer 20 monitors the residual ink amount in the ink container 200. For example, prior to starting printing, the main controller circuit 40 will read out residual ink amount information from the memory 140 to ascertain the residual ink amount; and upon completion of printing will calculate the residual ink amount based on the amount of ink consumed and update the residual ink amount information in the memory 140. That is, the main controller circuit 40 will decrement the residual ink amount information in the memory 140, as the ink is consumed. Once the residual ink amount has fallen below a prescribed value, the main controller circuit 40 will prompt the user to replace or refill the ink container 200.

The first printer-side sensor driving terminal PSN and the second printer-side sensor driving terminal PSP are connected to the sensor access unit 53. With the ink relay cartridge 100 in the installed state, the sensor access unit 53, via these terminals, will be able to operate the sensor 150 as described above to determine whether ink is present. If it is detected from the sensor result of the sensor 150 that the ink is at or below the prescribed value, the printer 20 will carry out a process to change the residual ink amount recorded in the memory to a prescribed value, for example.

Figure 8:
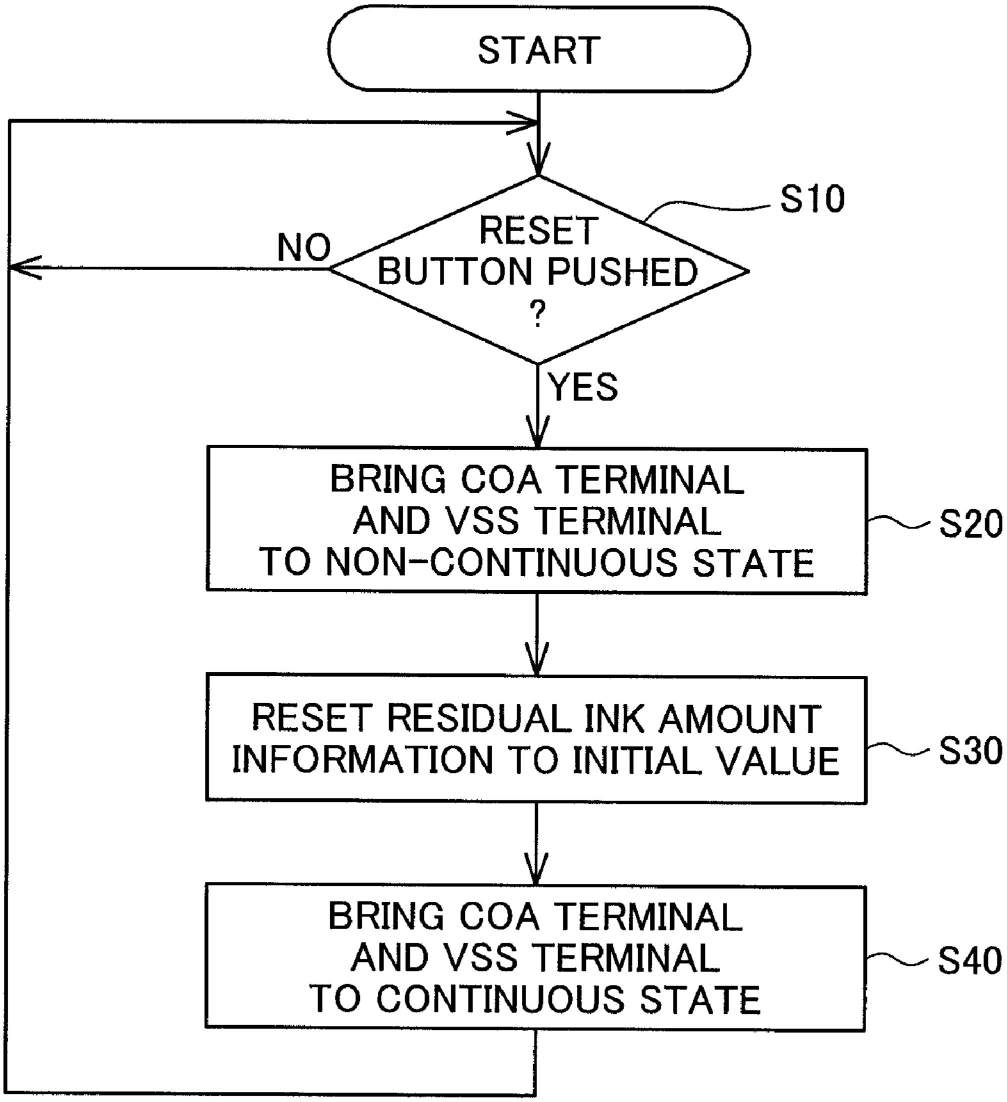
FIG. 8 is a flowchart showing process steps of a reset process of Embodiment 1.

FIG. 8 is a flowchart showing process steps of the reset process in Embodiment 1. The reset process is a process that is carried out in the ink relay cartridge 100 when the reset button 120 has been pushed. If the reset button 120 has been pushed (Step S10: YES), the first switch SWa will assume the OFF state, creating a state of non-continuity between the first cartridge out terminal COA and the ground terminal VSS (Step S20). In Step S30, the controller 130, which has detected that the second switch SWb is in the ON state, will change the residual ink amount information in the memory 140 to the initial value. This change of residual ink amount information takes place independently of access from the printer 20. That is, in Step S30, the controller 120 will change the residual ink amount information unprompted. In Step S40, the first switch SWa will be returned to the ON state, resulting in a state of continuity between the first cartridge out terminal COA and the ground terminal VSS. In the present embodiment, since the switches SWa, SWb are mechanical switches, Step S10, Step S20, and Step S40 are not processes that are carried out by the controller 130. Step S10 and Step S20 carried out mechanically, through pushing of the reset button 120 by the user.

Step S40 is also carried out mechanically, through return of the reset button 120 to its original state when the user stops pushing the reset button 120. That is, Step S30, which is carried out by the controller 130, takes place between pushing of the reset button 120 by the user and subsequent return of the reset button 120 to its original state when the user stops pushing the reset button 120.

As will be understood from the preceding description, in the present embodiment, the first switch SWa corresponds to the installed state notifier portion in the claims. In the present embodiment, the controller 130 corresponds to the information rewriting portion in the claims. Also, in the present embodiment, the first cartridge out terminal COA corresponds to the determination use terminal and the first terminal in the claims. In the present embodiment, the ground terminal VSS corresponds to the second terminal in the claims. Finally, in the present embodiment, the reset button 120 corresponds to the operation receiving portion in the claims.

According to Embodiment 1 described above, erroneous operation of the printer 20 can be avoided. For example, if the user is employing a larger ink container 200 than that recognized by the printer 20, by pushing the reset button 120 the residual ink amount information will be reset to its initial value, and the printer 20 can be prevented from determining that the ink is depleted, despite sufficient ink being present in the ink container 200.

Further, in the reset process, when the residual ink amount information in the memory 140 is rewritten to the initial value, non-continuity will be produced between the first cartridge out terminal COA and the ground terminal VSS. Thus, during the time that the residual ink amount information is being rewritten, the printer 20 will determine that the ink relay cartridge 100 in question is not installed (i.e. in the non-installed state). As a result, during the time that the residual ink amount information is being rewritten, the printer 20 can be prevented from accessing the memory 140, thus reducing the occurrence of problems such as data corruption. Thus, with the ink relay cartridge 100 remaining installed in the printer 20, the user will be able to push the reset button 120 to update date such as residual ink amount information, without giving rise to data corruption.

The reset button 120 is situated on the upper face of the housing 101 of the ink relay cartridge 100, i.e. on the face on the opposite side from the bottom face where the ink delivery portion 102 is located. As a result, the user can readily input a reset process instruction while the ink relay cartridge 100 remains installed in the printer 20.

Embodiment 2

Figure 9:
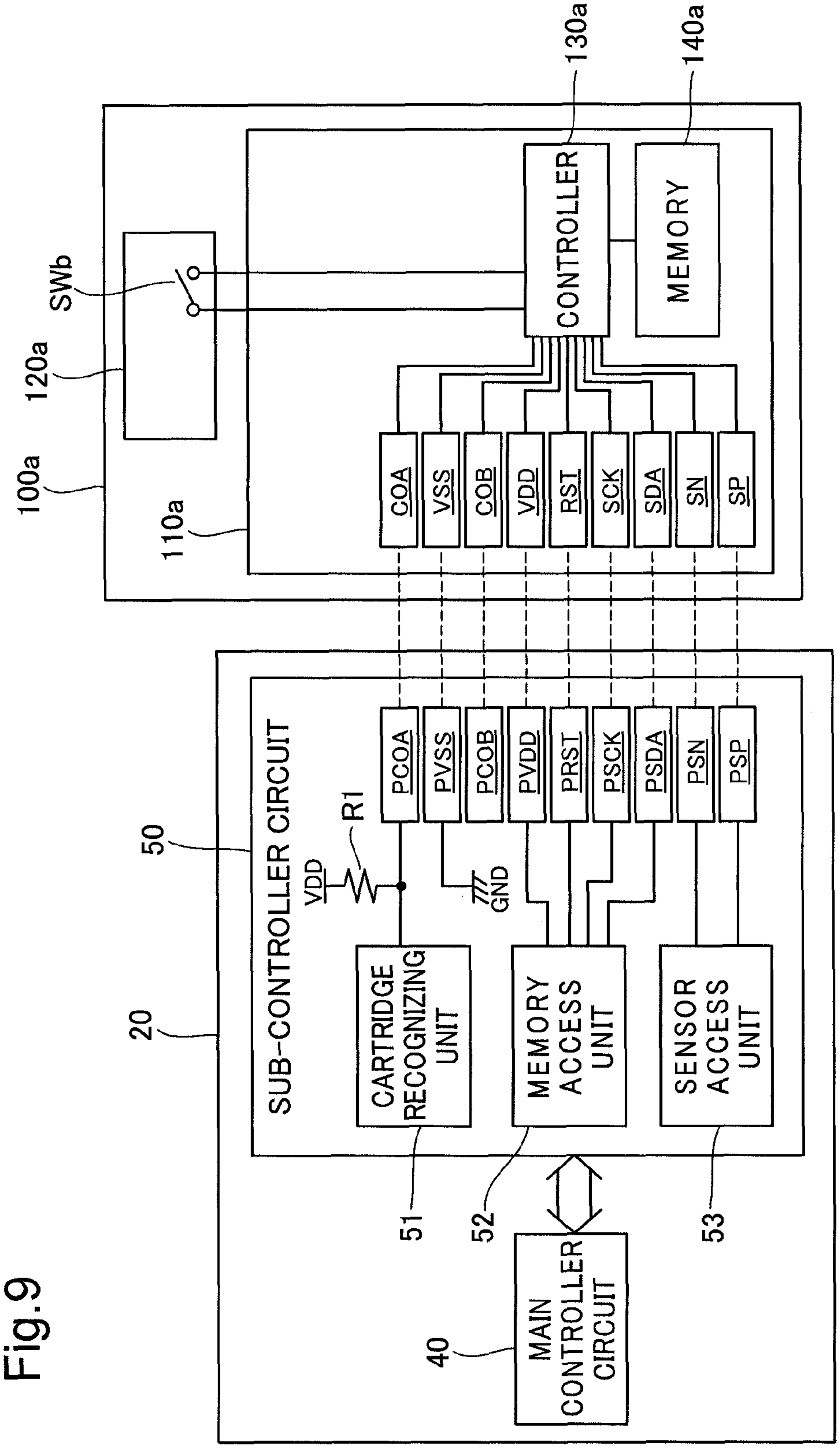
FIG. 9 is a diagram depicting an electrical configuration of an ink relay cartridge and a printer of Embodiment 2.

FIG. 9 is a diagram depicting an electrical configuration of an ink relay cartridge 100*a* and a printer 20 of Embodiment 2. The configuration of the printer 20 is identical to that in Embodiment 1 and will not be described here. The ink relay cartridge 100*a* of Embodiment 2 differs from that of Embodiment 1 in that it lacks a sensor 150; all nine of the terminals are instead connected to a controller 130*b* which is a logic circuit. The reset button 120*a* of the ink relay cartridge 100*a* of Embodiment 2 differs from that of Embodiment 1 in that it does not include the first switch SWa. In Embodiment 2, a sensor driving signal that the sensor access unit 53 has input via the sensor driving terminals SN, SP will be received by the controller 130*b*, which will always return a response signal indicating that ink 5 is present in the ink container 200. Additionally, in Embodiment 2, the controller 130*a* is furnished with a timer function adapted to measure a prescribed time interval.

Figure 10:
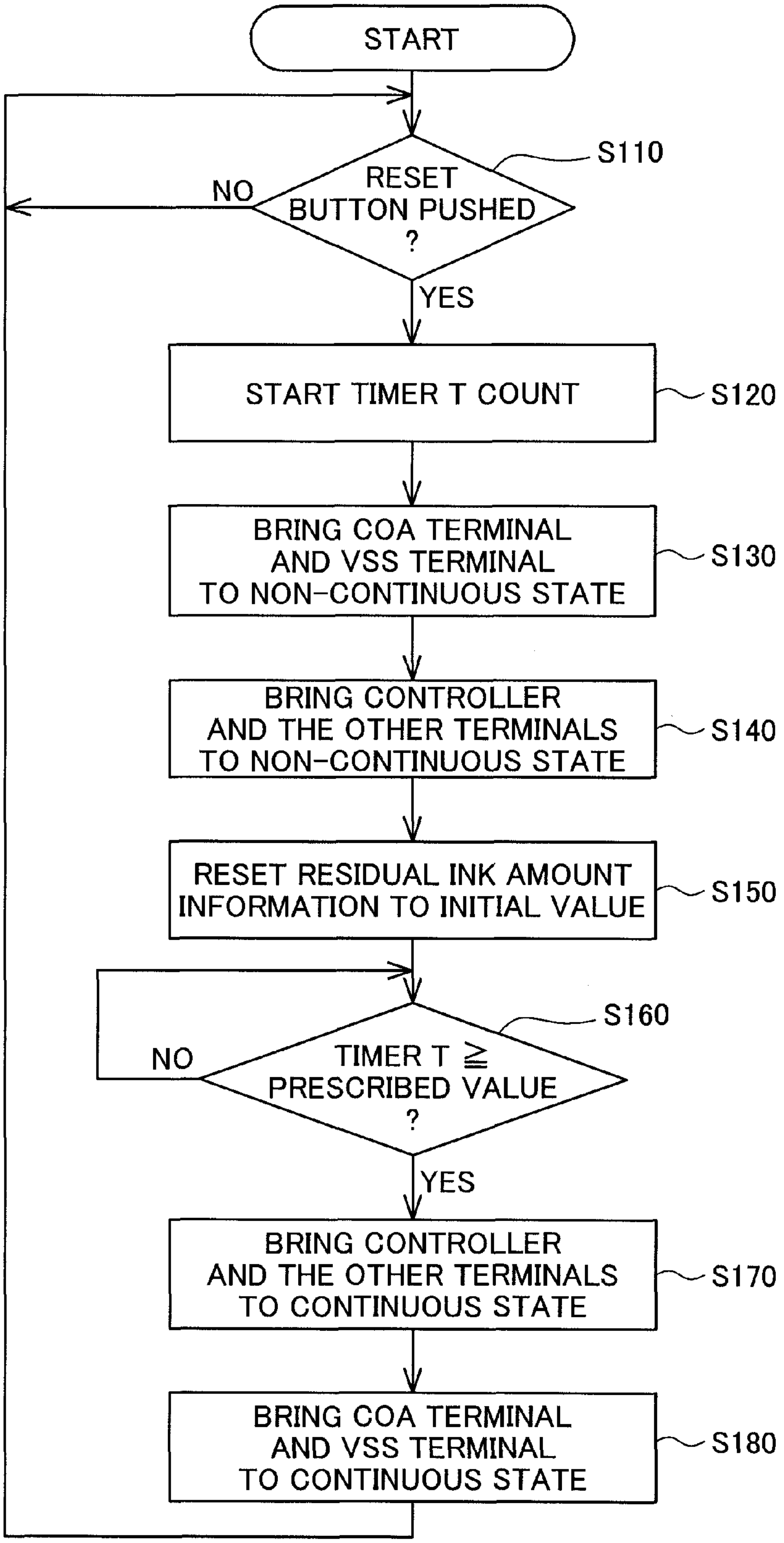
FIG. 10 is a flowchart showing process steps of a reset process of Embodiment 2.

FIG. 10 is a flowchart showing process steps of the reset process in Embodiment 2. When the reset button is pushed by the user, the second switch SWb will mechanically assume the ON state, so the controller 130*a* can detect that the reset button has been pushed. When the controller 130*a* detects that the reset button has been pushed (Step S110: YES), it will initiate the reset process. In Step S120, the controller 130*a* will initiate a count by a timer T. In Step S130, the controller 130*a* will place the first cartridge out terminal COA and the ground terminal VSS in a state of non-continuity. Specifically, the first cartridge out terminal COA and the ground terminal VSS will be placed in the state of non-continuity by a switch composed of a transistor inside the controller 130*a*. In Step S140, the controller 130*a* will produce a state of non-continuity between the controller 130*a* and the other seven terminals, except for the first cartridge out terminal COA and the ground terminal VSS. In Step S150, the controller 130*a* will rewrite the residual ink amount information in the memory 140*a* to the initial value. In Step S160, the controller 130*a* will decide if the timer T has reached a prescribed value or above. The prescribed value will be a value that corresponds to a time interval longer than the interval needed for the memory 140*a* to assume a state enabling it to handle subsequent access, for example. If it is determined that that the timer T has not yet reached the prescribed value (Step S160: NO), the controller 130*a* will wait. If it is determined that that the timer T has reached the prescribed value or more (Step S160: YES), the controller 130*a* will restore a state of continuity between the controller 130*a* and the other seven terminals mentioned above (Step S170). In Step S180, the controller 130*a* will restore a state of continuity between the first cartridge out terminal COA and the ground terminal VSS, and terminate the reset process.

As will be understood from the preceding description, in the present embodiment, the controller 130*a* corresponds to the installed state notifier portion in the claims. In the present embodiment, the controller 130*a* corresponds to the information rewriting portion in the claims.

Embodiment 2 described above affords advantages comparable to those of Embodiment 1. Additionally, in Embodiment 2, when the residual ink amount information in the memory 140*a* is reset to the initial value, the seven terminals by which the printer 20 accesses the memory and the sensor will be cut off, or placed in a state of non-continuity, from the controller 130*a*. Thus, problems such as data corruption arising when the printer 20 erroneously attempts to access the memory 140*a* while the residual ink amount information is being reset to the initial value can be avoided more reliably.

C. Embodiment 3

Figure 11:
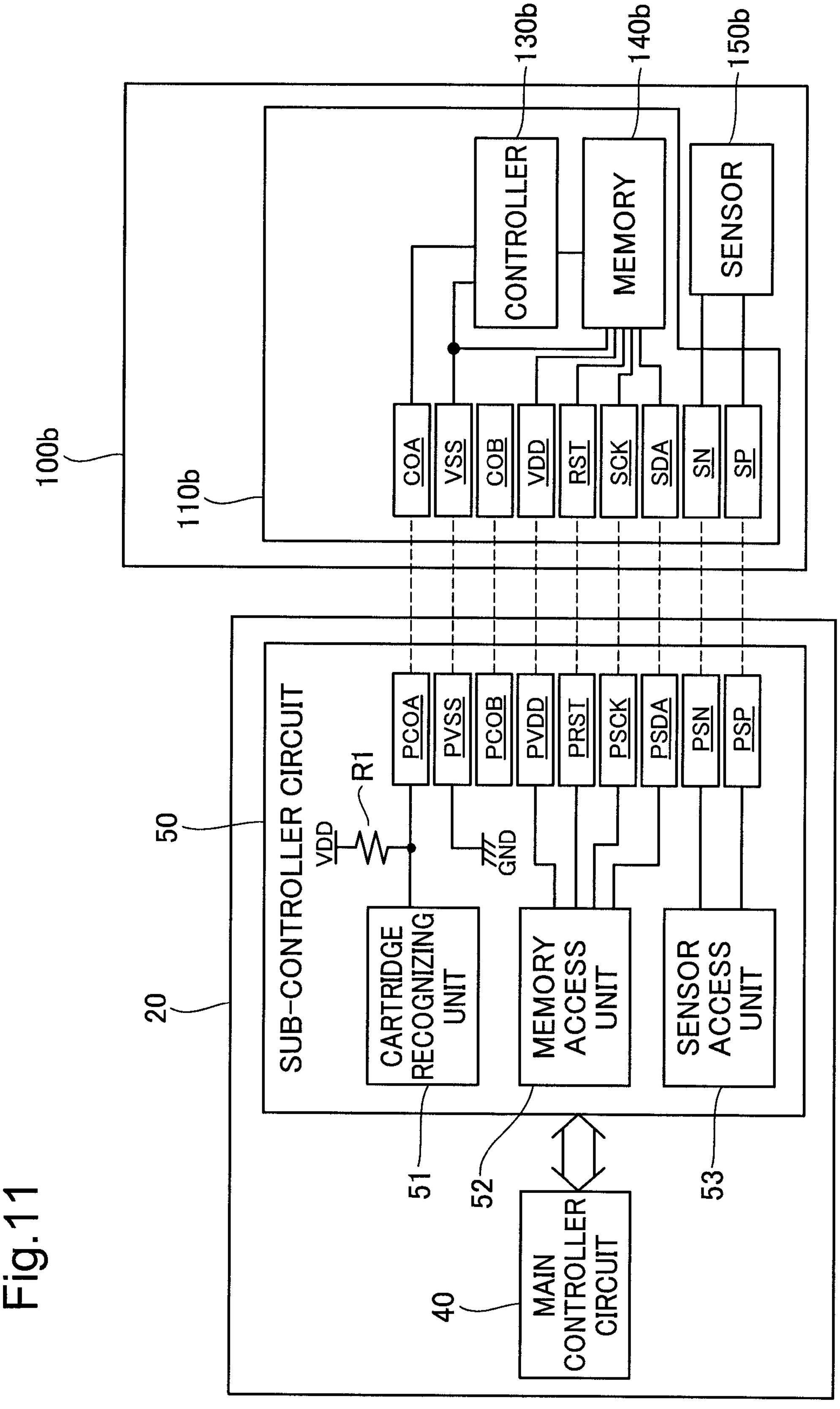
FIG. 11 is a diagram depicting an electrical configuration of an ink relay cartridge and a printer of Embodiment 3.

FIG. 11 is a diagram depicting an electrical configuration of an ink relay cartridge 100*b* and a printer 20 of Embodiment 3. The configuration of the printer 20 is identical to that in Embodiment 1 and will not be described here. The ink relay cartridge 100*b* of Embodiment 3 differs from that of Embodiment 1 in that it lacks the reset button 120; instead, the first cartridge out terminal COA and the ground terminal VSS are connected to a controller 130*b* which is a logic circuit. Other arrangements are the same as in Embodiment 1.

Figure 12:
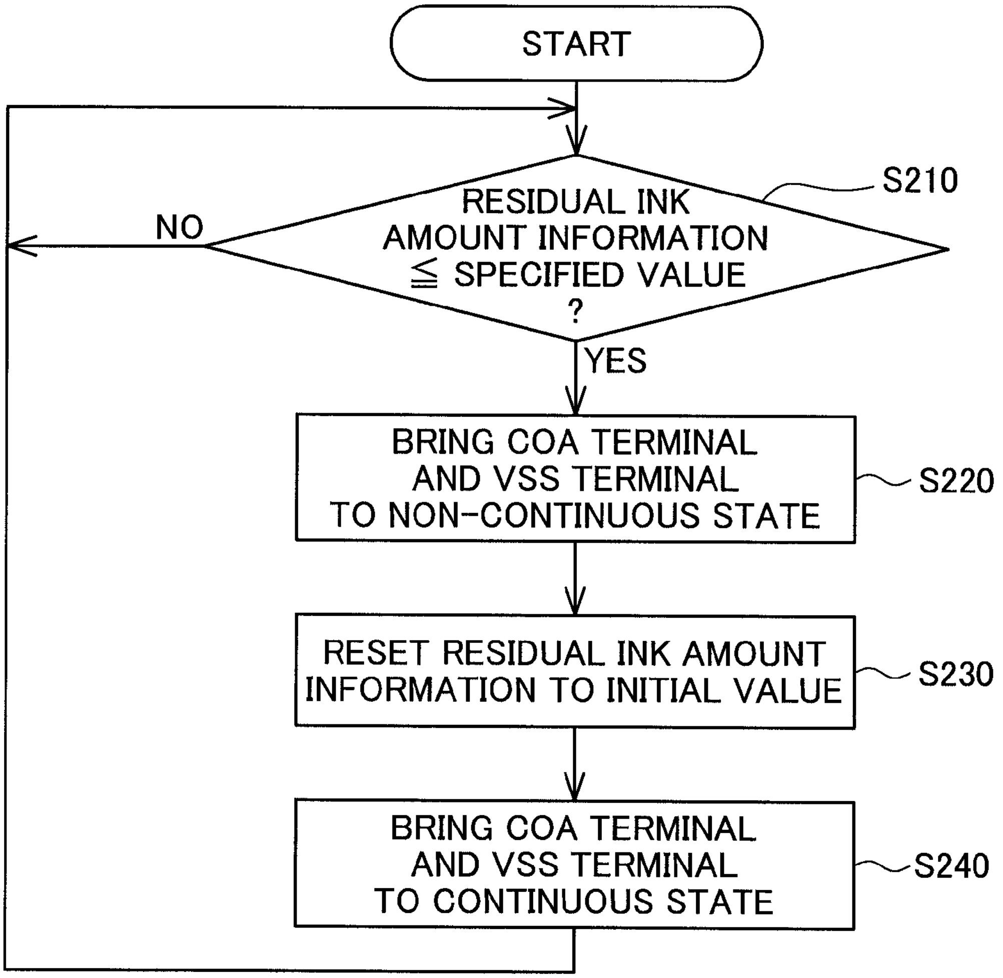
FIG. 12 is a flowchart showing process steps of a reset process of Embodiment 3.

FIG. 12 is a flowchart showing the process steps of the reset process of Embodiment 3. With the ink relay cartridge 100*b* in the installed state, the controller 130*b* will check the residual ink amount information periodically or each time that the residual ink amount information is updated, to determine whether the residual ink amount information is equal to or less than a specified value (Step S210). If the residual ink amount information exceeds a specified value (Step S210: NO), i.e. where the residual ink amount information shows that “the amount of ink 5 contained in the ink container 200 exceeds a prescribed amount,” the controller 130*b* will wait. On the other hand, if the residual ink amount information is equal to or less than the specified value (Step S210: YES), i.e. where the residual ink amount information shows that “the amount of ink 5 contained in the ink container 200 is equal to or less than a prescribed amount,” the controller 130*b* will place the first cartridge out terminal COA and the ground terminal VSS in a state of non-continuity (Step S220). In Step S230, the controller 130*b* will rewrite the residual ink amount information in the memory 140*b* to the initial value. After rewriting the residual ink amount information, in Step S240, the controller 130*b* will return the first cartridge out terminal COA and the ground terminal VSS to a state of continuity.

As will be understood from the preceding description, in the present embodiment, the controller 130*b* corresponds to the installed state notifier portion in the claims. In the present embodiment, the controller 130*b* also corresponds to the information rewriting portion in the claims.

According to Embodiment 3 discussed above, if the residual ink amount information is equal to or less than the specified value, the residual ink amount information will be automatically changed to the initial value, so the printer 20 will be able to continue printing with no problem, even if the user employs a large-capacity ink container 200, or appropriately replenishes the ink container 200 with ink 5.

Additionally, in the same way as in Embodiment 1, when the residual ink amount information in the memory 140 is rewritten to the initial value during the reset process, a state of non-continuity will be brought about between the first cartridge out terminal COA and the ground terminal VSS. As a result, problems such as data corruption arising when the printer 20 attempts to access the memory 140 during times that the residual ink amount information is being rewritten can be avoided.

D. Embodiment 4

Figure 13:
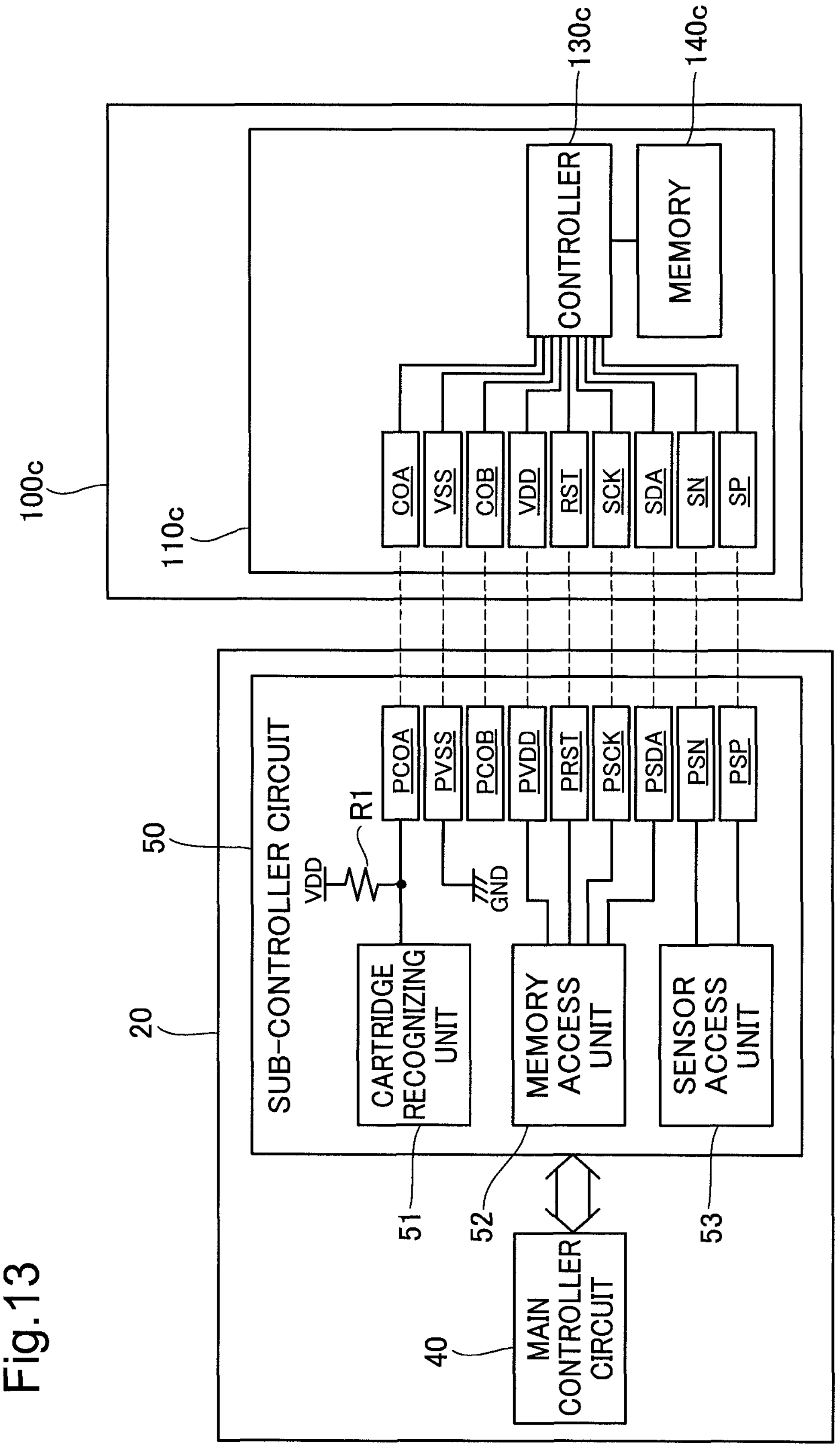
FIG. 13 is a diagram depicting an electrical configuration of an ink relay cartridge and a printer of Embodiment 4.

FIG. 13 is a diagram depicting an electrical configuration of an ink relay cartridge 100*a* and a printer 20 of Embodiment 4. The configuration of the printer 20 is identical to that in Embodiment 1 and will not be described here. The ink relay cartridge 100*c* of Embodiment 4 differs from that of Embodiment 2 in that it lacks the reset button 120*b*. Other arrangements are the same as in Embodiment 2.

Figure 14:
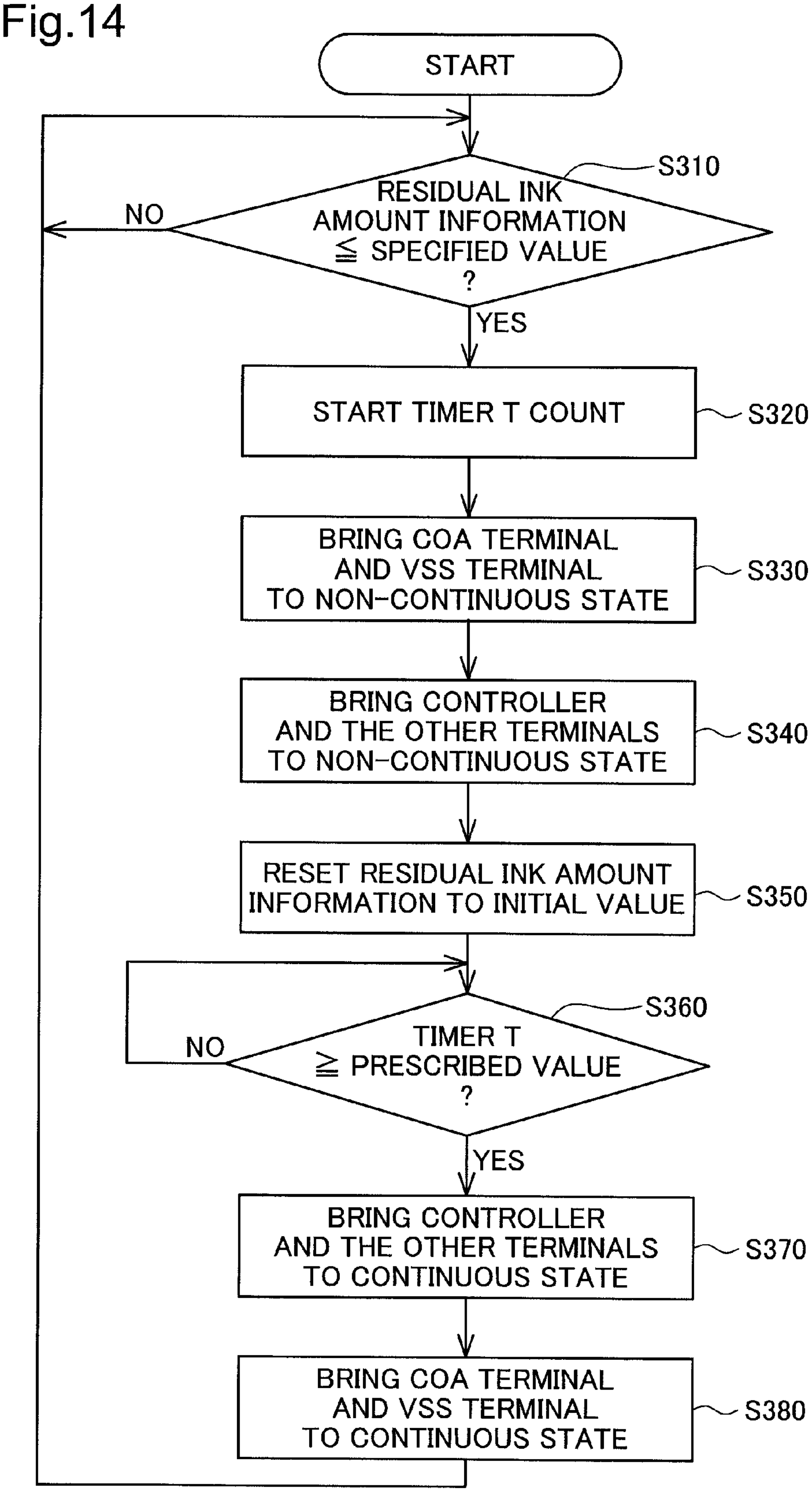
FIG. 14 is a flowchart showing process steps of a reset process of Embodiment 4.

FIG. 14 is a flowchart showing process steps of the reset process of Embodiment 4. As in Embodiment 3, with the ink relay cartridge 100*c* in the installed state, the controller 130*c* will check the residual ink amount information periodically or each time that the residual ink amount information is updated, to determine whether the residual ink amount information is equal to or less than a specified value (Step S310). If the residual ink amount information exceeds a specified value (Step S310: NO), the controller 130*c* will wait. On the other hand, if the residual ink amount information is equal to or less than the specified value (Step S310: YES), the controller 130*c* will proceed to Step S320. The process from Steps S320 to S380 is identical to the process from Steps S120 to S180 in Embodiment 2 (FIG. 10).

As will be understood from the preceding description, in the present embodiment, the controller 130*c* corresponds to the installed state notifier portion in the claims. In the present embodiment, the controller 130*c* also corresponds to the information rewriting portion in the claims. Embodiment 4 described above affords advantages comparable to those of Embodiment 3. Additionally, in Embodiment 4, when the residual ink amount information in the memory 140*c* is reset to the initial value, the seven terminals through which the printer 20 accesses the memory and the sensor will be cut off, or placed in a state of non-continuity, from the controller 130*c*. Thus, problems such as data corruption arising when the printer 20 erroneously attempts to access the memory 140*c* while the residual ink amount information is being restored to the initial value can be avoided more reliably.

E. Embodiment 5

Figure 15:
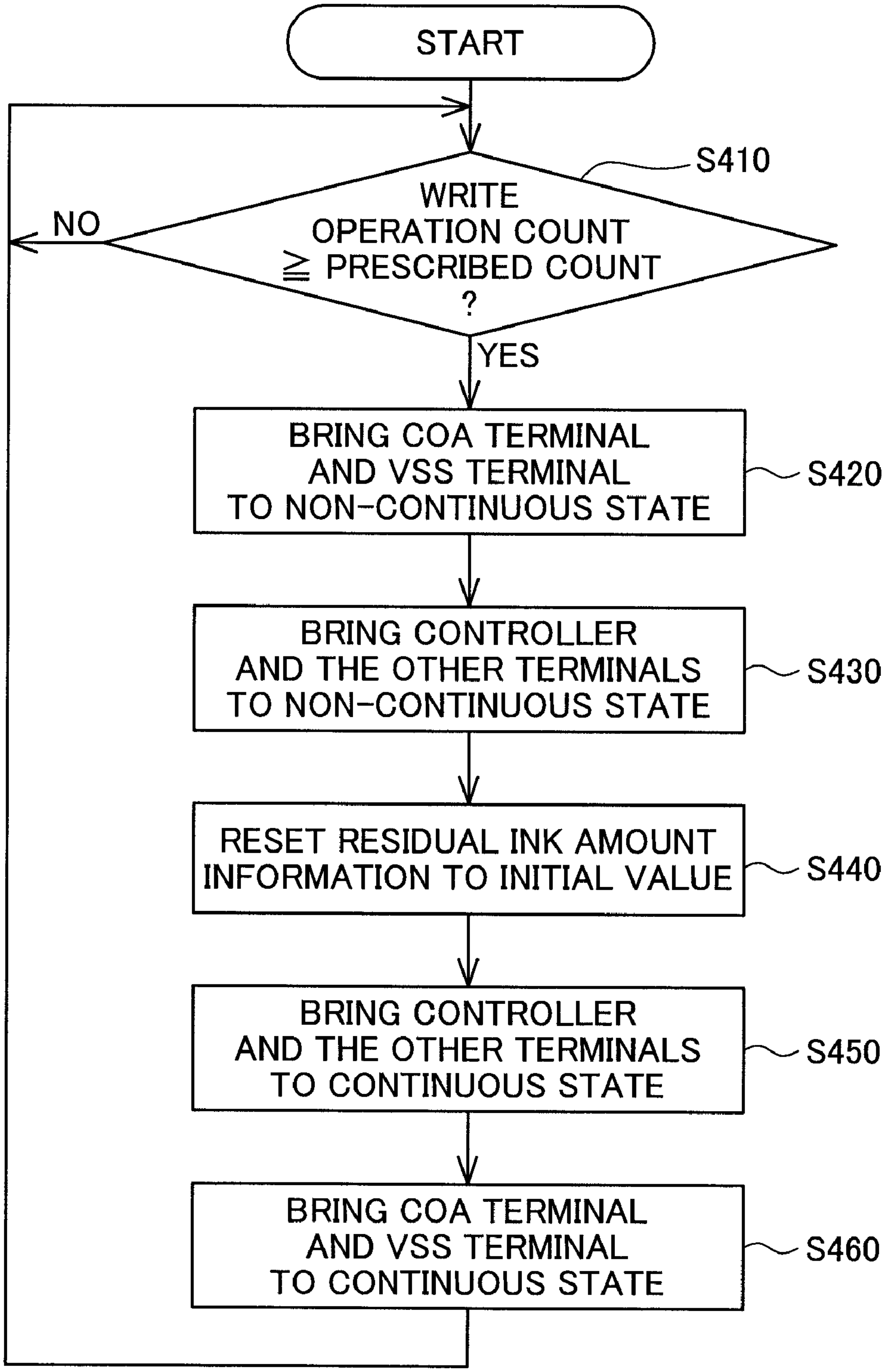
FIG. 15 is a flowchart showing process steps of a reset process in Embodiment 5.

FIG. 15 is a flowchart showing process steps of a reset process in Embodiment 5. The configurations of the printer and the ink relay cartridge in Embodiment 5 are the same as in Embodiment 4 (FIG. 13), so the following description will employ the same symbols used in Embodiment 4. In Embodiment 5, with the ink relay cartridge 100*c* in the installed state, the controller 130*c* will check a write operation count, or the number of times that the residual ink amount information was updated by the printer 20, and determine whether the number of write operations on the residual ink amount information exceeds a prescribed number of times (Step S410). This write operation count may be stored in the memory 140*c* in a different area from the area where residual ink amount information is stored.

If the residual ink amount information write operation count is less than the prescribed number of times (Step S410: NO), the controller 130*c* will wait. On the other hand, if the residual ink amount information write operation count is equal to or more than the prescribed number of times (Step S410: YES), the controller 130*c* will proceed to Step S420. The processes from Steps S420 to S360 are respectively identical to the processes in Steps S130, S140, S150, S170, and S180 in Embodiment 2 (FIG. 10). Embodiment 5 described above affords advantages comparable to those of Embodiment 4.

F. Modified Embodiments

Modified Embodiment 1

In the reset processes of the preceding embodiments, the value of the residual ink amount information is reset to its initial value; however, it may instead be changed to a value representing an amount equivalent to approximately half the capacity of the ink container 200 whose residual ink amount is being assumed, or changed to some other value equivalent to a residual amount increased by a prescribed amount. In general, it is acceptable to rewrite the value to any prescribed value that represents the presence of a certain amount of ink.

Modified Embodiment 2

In the reset processes of the preceding embodiments, a value of residual ink amount information is rewritten; however, a value representing consumed ink amount information may be rewritten instead. In this case, the value of consumed ink amount information may be reset to its initial value if, for example, the value representing consumed ink amount information is equal to or greater than a prescribed value, or if the reset button has been pushed. The present invention is not limited to implementation in a reset process, and is applicable generally to all manner of processes in which ink information relating to ink is rewritten independently of access by the printer 20. For example, one such possible process is to change the color information indicating the ink color to reflect the color of the refilled ink when an ink cartridge is filled with ink of a different color from that initially filled. Through implementation of the present invention in such cases, problems such as data corruption can be reduced.

Modified Embodiment 3

In the preceding embodiments, by bringing about a state of non-continuity between the first cartridge out terminal COA and the ground terminal VSS, the printer 20 will be caused to make a determination that a non-installed state exists, despite the fact that an installed state exists. However, in an alternative arrangement, in the installed state, some kind of installation communicating signal may be sent periodically from the controller of the ink relay cartridge to provide notification of the installed state, and the printer 20 may be caused to make a determination that a non-installed state exists by interruption of this installation communicating signal. Generally speaking, it is acceptable to have means for notifying the printer 20 of the installed state and means for notifying of the non-installed state, even when the ink cartridge is actually in the installed state. In preferred practice, these means will be alternatively and exclusively switchable between a state in which the printer 20 is caused to make a determination that an installed state exists, and a state in which the printer 20 is caused to make a determination that a non-installed state exists.

Modified Embodiment 4

In the preceding embodiments, at times that the value of residual ink amount information is being rewritten in memory, the printer 20 will be caused to make a determination that a non-installed state exists, despite the ink relay cartridge being in the installed state; however, the printer 20 may be caused to make a determination that a non-installed state exists in other instances as well. For example, the printer 20 may be caused to make a determination that a non-installed state exists despite the ink relay cartridge being in the installed state, if the printer 20 has not been used for some time while the ink relay cartridge remains installed in it. As long as the printer 20 has been set up so that, for example, printing operations are disabled when the ink relay cartridge is determined as being in the non-installed state, misoperation of the printer 20 when not in use can be prevented more reliably.

Modified Embodiment 5

In the preceding embodiments, the residual ink amount information will be rewritten, for example, when the reset button 120 has been pushed, or when the residual ink amount information is equal to or less than a prescribed value; however, it would be acceptable instead to rewrite the residual ink amount information when some other condition has been met.

Modified Embodiment 6

In the preceding Embodiment 1, a sensor 150 that employs a piezoelectric element is used, but it would be possible to instead employ an oscillator device such as an oscillator circuit designed to always return a response signal of a frequency indicating that ink is present; or to employ a processor such as a CPU or ASIC, or a simpler IC, to carry out exchanges with the sub-controller 50.

Modified Embodiment 7

In the preceding embodiments, a single ink tank makes up a single ink relay cartridge, but instead a plurality of ink tanks may make up a single ink relay cartridge.

Modified Embodiment 8

While the preceding embodiments employ a printer and ink cartridges of inkjet format, it would also be acceptable to employ a liquid jetting device adapted to jet or eject a liquid other than ink, and a liquid container containing such a liquid. Herein, the term liquid is used to include liquid-like matter containing particles of a functional material dispersed in a medium; or fluid-like matter of gel form. For example, there may be employed liquid jetting devices adapted to jet liquids that contain an electrode material, coloring matter, or other matter in dispersed or dissolved form used in the manufacture of liquid crystal displays, EL (electroluminescence) displays, field emission displays, or color filters; liquid jetting devices adapted to jet bioorganic substances used in biochip manufacture; or liquid jetting devices adapted to jet liquids as specimens used as precision pipettes. Additional examples are liquid jetting devices for pinpoint jetting of lubricants into precision instruments such as clocks or cameras; liquid jetting devices adapted to jet a solution of an ultraviolet-curing resin or other transparent resin onto a substrate for the purpose of forming a micro semi-spherical lens (optical lens) for use in optical communication elements etc.; or liquid jetting devices adapted to jet an acid or alkali etchant solution for etching circuit boards, etc. The present invention can be implemented in any of the above types of jetting devices and liquid containers for these liquids.

Modified Embodiment 9

Some of the arrangements that have been implemented through hardware in the preceding embodiments may instead be implemented through software, and conversely some of the arrangements that have been implemented through software may instead be implemented through hardware.

Modified Embodiment 10

In the reset processes of the preceding embodiments, a value of the residual ink amount information is rewritten; however, a value of other liquid information stored in the memory 140 may be rewritten in addition to the residual ink amount information or in place of the residual ink amount information. For example, various kinds of liquid information stored in the memory 140 may be rewritten so that after the reset process, the printer 20 will recognize that a new ink relay cartridge 100 has been installed. Specific examples would be where the memory 140 records usage history information that is incremented each time that the printer 20 executes printing, or unique ID information for each ink relay cartridge 100. In this case, during the reset process the controller 130 may rewrite the usage history information to the initial value, or rewrite the ID information to a different value, for example.

Modified Embodiment 11

In the preceding embodiments, the cartridge recognizing unit 51 of the printer 20 will determine whether the ink relay cartridge 100 is currently installed, based on whether the potential on the first cartridge out terminal COA (potential on the first printer-side cartridge out terminal PCOA) is at ground potential or power supply potential, but the method for determining whether the ink relay cartridge 100 has been installed is not limited to this. The configuration by which the printer is made to determine whether an installed state or a non-installed state exists when the ink relay cartridge is in the installed state may be modified appropriately according to the method by which the printer determines whether an ink relay cartridge has been installed. Examples will be described as Modified Embodiment 11 and Modified Embodiment 12.

Figure 16:
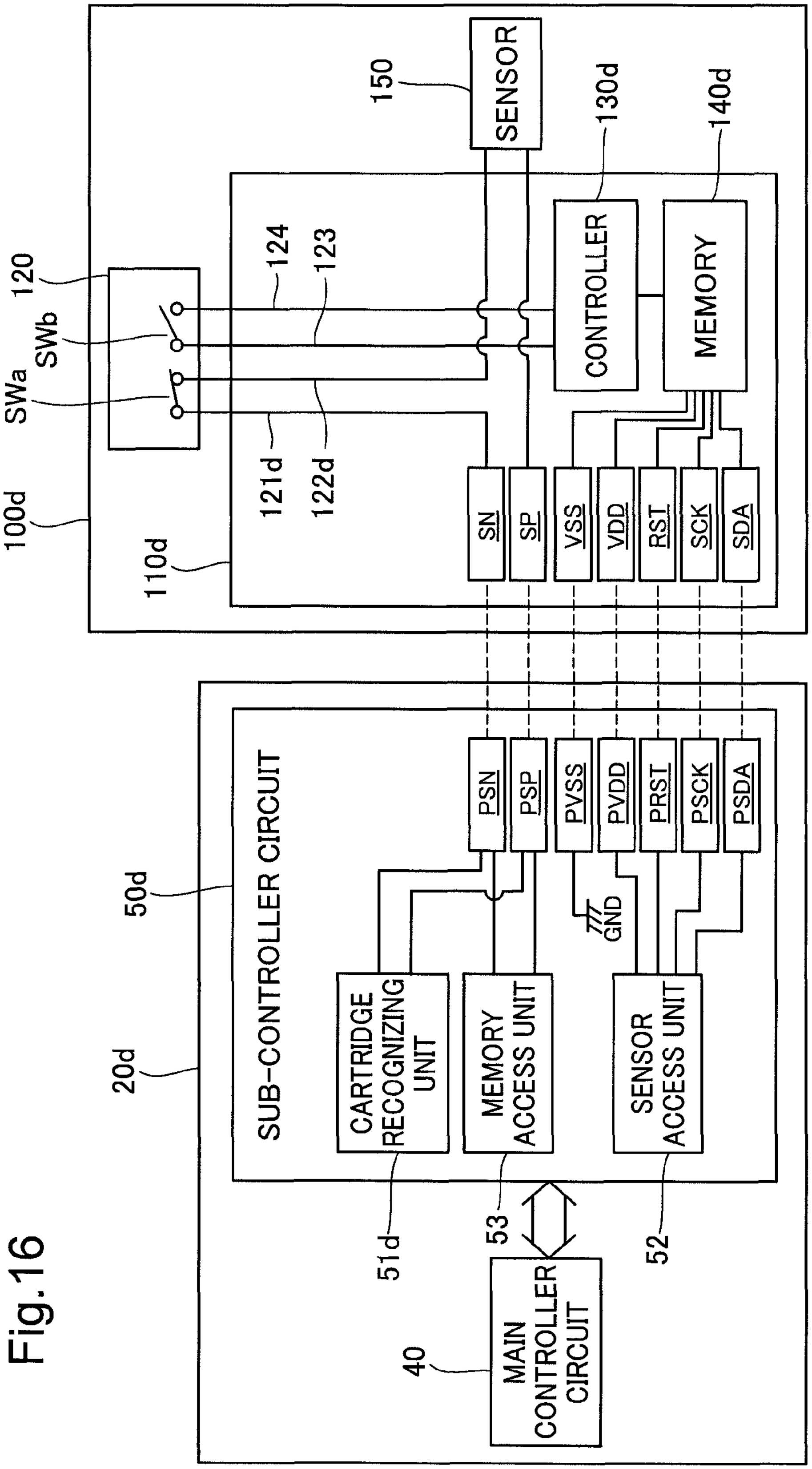
FIG. 16 is a diagram depicting an electrical configuration of an ink relay cartridge and a printer of Modified Embodiment 11.

FIG. 16 is a diagram depicting an electrical configuration of an ink relay cartridge and a printer of Modified Embodiment 11. In FIG. 16, for arrangements different from the electrical arrangements of Embodiment 1 (FIG. 7), the suffix "d" has been appended to the symbols; while for like arrangements the same symbols as in FIG. 7 have been assigned. The ink relay cartridge 100*d* of Modified Embodiment 11 lacks the first cartridge out terminal COA and the second cartridge out terminal COB. In the ink relay cartridge 100*d*, the sensor driving terminal SN is connected via a line 121*d* to one end of the first switch SWa. The other end of the first switch SWa is connected to one of the electrode plates of the piezoelectric element of the sensor 150. The second sensor driving terminal SP is connected to one of the electrode plates of the piezoelectric element of the sensor 150 in the same manner as in Embodiment 1. Other arrangements of the ink relay cartridge 100*d* are comparable to Embodiment 1 and will not be described here.

The printer 20*d* in Modified Embodiment 11 lacks the first and second printer-side cartridge out terminals PCOA and PCOB. The cartridge recognizing unit 51*d* in Modified Embodiment 11 is connected to the first printer-side sensor driving terminal PSN and the second printer-side sensor driving terminal PSP. The cartridge recognizing unit 51*d* inputs a pulse signal as an input signal to the first printer-side sensor driving terminal PSN. If, in response to input of the pulse signal, a response signal comparable to the input pulse signal appears on the second printer-side sensor driving terminal PSP, the cartridge recognizing unit 51*d* will determine that the ink relay cartridge 100*d* has been installed. If on the other hand no response signal appears on the second printer-side sensor driving terminal PSP despite input of a pulse signal, the cartridge recognizing unit 51*d* will determine that the ink relay cartridge 100*d* has not been installed. Where a piezoelectric element is used as the sensor 150, such a determination will be possible because the piezoelectric element is a kind of capacitor. That is, where the ink relay cartridge 100*d* is installed and the first switch SWa is in the ON state, a pulse signal that has been input to the first printer-side sensor driving terminal PSN will be presented to one of the electrode plates of the piezoelectric element of the sensor 150 via the first sensor driving terminal SN and the switch SWa. Thereupon, the other electrode plate of the piezoelectric element of the sensor 150 will assume potential of opposite polarity from the potential of the pulse signal. According to the law of conservation of charge, potential comparable to that of the pulse signal will appear at this point on the second sensor driving terminal SP which is connected to the other electrode plate of the piezoelectric element of the sensor 150. When the potential that appears on the second sensor driving terminal SP is sensed as a response signal via the second printer-side sensor driving terminal PSP, the cartridge recognizing unit 51*d* will recognize that the ink relay cartridge 100*d* has been installed.

Here, if the first switch SWa is in the OFF state, that is, where the first printer-side sensor driving terminal PSN and the first sensor driving terminal SN have assumed a high-impedance state (floating state), even if pulse signal has been input from the first printer-side sensor driving terminal PSN, no response signal will appear on the second printer-side sensor driving terminal PSP. Consequently, if the first switch SWa is in the OFF state, even if the ink relay cartridge 100*d* is currently installed in the printer 20*d*, the printer 20*d* will determine that the ink cartridge 100*d* is not installed. In the same way as in Embodiment 1, if the reset button 120 has not been pressed, in the ink relay cartridge 100*d* the first switch SWa will be in the ON state and the second switch SWb will be in the OFF state. In the same way as in Embodiment 1, if the reset button 120 is then pressed, in the ink relay cartridge 100*d* the first switch SWa will go to the OFF state and the second switch SWb will go to the ON state.

In the same manner as in Embodiment 1, when the reset button 120 is pushed by the user, the controller 130 of the ink relay cartridge 100*d* in Modified Embodiment 11 will recognize via the second switch SWb that the reset button 120 has been pushed, and will rewrite the residual ink amount information in the memory 140*d* to the initial value. This rewriting of residual ink amount information will take place while the reset button 120 is being pushed by the user. In the same manner as in Embodiment 1, during the interval that the reset button 120 is being pushed by the user the first switch SWa will be in the OFF state, so the printer 20*d* will determine that the ink relay cartridge 100*d* is not installed. Modified Embodiment 11 described above affords advantages comparable to those of Embodiment 1.

In Modified Embodiment 11 described above, the first switch SWa is situated between the first sensor driving terminal SN and the sensor 150 so that the first sensor driving terminal SN assumes a high-impedance state (floating state) during the time that the reset button 120 is being pushed by the user; however, the first switch SWa may instead be situated between the second sensor driving terminal SP and the sensor 150 so that the second sensor driving terminal SP assumes a high-impedance state (floating state). Alternatively, switches may be situated respectively between both the second sensor driving terminal SP and the sensor 150, and the first sensor driving terminal SN and the sensor 150. In general, in an ink relay cartridge adapted for installation in a printer designed to input an input signal and receive a response signal in order to sense whether an ink relay cartridge has been installed, any configuration whereby it is possible for at least either one of the terminal that receives the input signal and the terminal that outputs the response signal to be brought to a high-impedance state (floating state) will be acceptable.

Modified Embodiment 12

Figure 17:
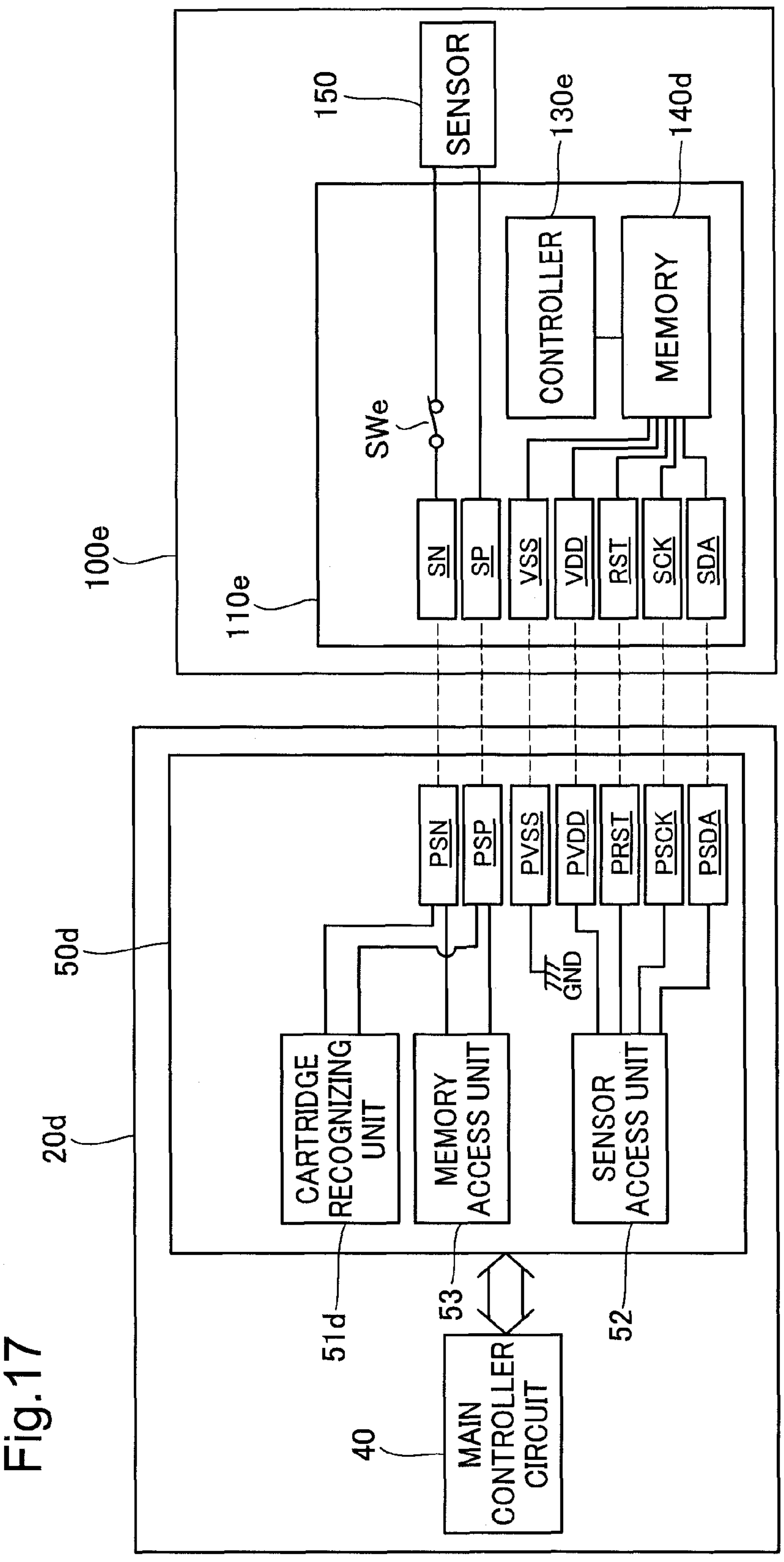
FIG. 17 is a diagram depicting an electrical configuration of an ink relay cartridge and a printer of Modified Embodiment 12.

FIG. 17 is a diagram depicting an electrical configuration of an ink relay cartridge and a printer of Modified Embodiment 12. The configuration and operation of the printer 50*d* of Modified Embodiment 12 are similar to Modified Embodiment 11 and will not be described here. In the ink relay cartridge 100*e* of Modified Embodiment 12 depicted in FIG. 17, for arrangements different from the electrical arrangements of the ink relay cartridge 100*d* of Embodiment 1 (FIG. 7), the suffix "e" has been appended to the symbols, while for like arrangements the same symbols as in FIG. 16 have been assigned. The ink relay cartridge 100*e* of Modified Embodiment 12 differs from the ink relay cartridge 100*d* of Modified Embodiment 11 in that the ink relay cartridge 100*e* lacks the reset button 120 and the first switches SWa, SWb; and that a switch SWe operated under the control of the controller 130*e* is provided instead of the first switch SWa. The switch SWe is situated between the first sensor driving terminal SN and one of the electrode plates of the piezoelectric element of the sensor 150, and is adapted to switch the connection of the first sensor driving terminal SN and the electrode plates of the piezoelectric element of the sensor 150 between a state of continuity and a state of non-continuity.

The controller 130*e* normally controls the switch SWe to the ON state. When a prescribed condition has been met, for example if residual ink amount information recorded in the memory 140 is at or below a specified value, the controller 130*e* will place the switch SWe in the OFF state and will rewrite the residual ink amount information recorded in the memory 140 to the initial value. After the residual ink amount information has been rewritten to the initial value, the controller 130*e* will return the switch SWe to the ON state. That is, when a prescribed condition has been met, the controller 130*e* will bring the first sensor driving terminal SN to a high-impedance state (floating state), and will rewrite the memory 140 during the interval for which the first sensor driving terminal SN is held in a high-impedance state (floating state). Modified Embodiment 12 described above affords advantages comparable to those of Embodiment 2.

The switch SWe in Modified Embodiment 12 may instead be situated between the second sensor driving terminal SP and the sensor 150; or two switches may be respectively situated between the second sensor driving terminal SP and the sensor 150, and between the first sensor driving terminal SN and the sensor 150.

As will be understood from the preceding description, in Modified Embodiment 11 and Modified Embodiment 12, the sensor driving terminal SN and the second sensor driving terminal SP correspond to the determination use terminal in the claims.

Modified Embodiment 13

In Embodiment 4 above, the controller 130*c* causes the printer 20 to make a determination that a non-installed state exists by cutting off the first cartridge out terminal COA from the ground terminal VSS to bring about a high-impedance state; however, the controller 130*c* may instead input an H level signal to the first cartridge out terminal COA in order to cause the printer 20 to make a determination that a non-installed state exists. For example, using a driver, the controller 130*c* may input H level voltage as an H level signal to the first cartridge out terminal COA in order to cause the printer 20 to make a determination that a non-installed state exists. Consider an instance where, in an arrangement in which the first sensor driving terminal SN and the second sensor driving terminal SP are connected to the controller 130*c* as described in Embodiment 4, the determination as to whether an ink relay cartridge is installed is made via the first sensor driving terminal SN and the second sensor driving terminal SP as described in Modified Embodiment 11. In this instance, the controller 130*c* may cause the printer to make a determination that an installed state exists by outputting from the second sensor driving terminal SP a pulse signal that was generated by the controller 130*c* when a pulse signal was received via the first sensor driving terminal SN; and cause the printer to make a determination that a non-installed state exists by outputting an L level signal from the second sensor driving terminal SP when a pulse signal has been received via the first sensor driving terminal SN. Generally speaking, the printer may be caused to make a determination that a non-installed state exists by inputting from the ink relay cartridge side a signal that indicates non-installation of the ink relay cartridge, to a determination use terminal that is used by the printer to determine whether an ink relay cartridge is installed.

Modified Embodiment 14

Figure 18:
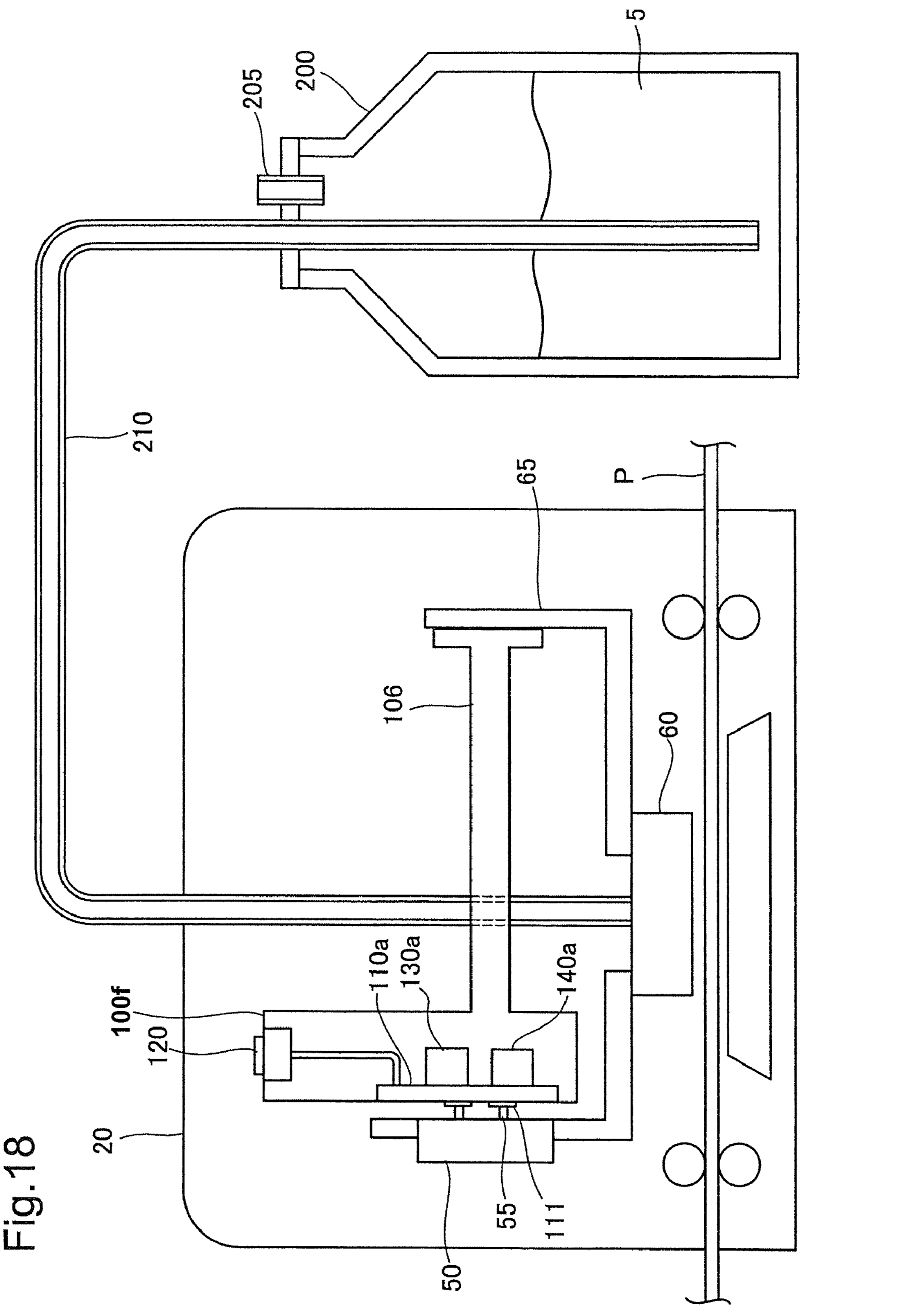
FIG. 18 is a diagram depicting an overview of an ink delivery system in Modified Embodiment 14.

In the preceding embodiments, the tube 210 is connected to the ink relay cartridge 100, and the ink 5 inside the ink container 200 is delivered via the tube 210 and the ink flow channel 105 inside the ink relay cartridge 100; however, no particular limitation is imposed thereby. FIG. 18 is a diagram depicting an overview of an ink delivery system in Modified Embodiment 14. In the ink delivery system of Modified Embodiment 14, the tube 210 connects directly to the print head unit 60. Separately from the tube 210, an attachment 100*f* that is mounted on the board 110*a* (FIG. 9) in Embodiment 2 is installed in the holder 65. The attachment 100*f* is secured in the holder 65 by a securing portion 106, while the board 110*a* of the attachment 100*f* is electrically connected to the sub-controller 50 via a printer-side terminal 55 in a manner analogous to Embodiment 2. Operations of the memory 140*a* of the board 110*a* mounted on the attachment 100*f*, of the controller 130*a*, and of the reset button 120 are comparable to those in Embodiment 2, and will not be described in detail.

It is not essential for the apparatus on which the board 110*a* is mounted to be one adapted to relay between the tube 210 and the print head unit 60; any mountable apparatus adapted for installation in a printer 20 when supplying ink 5 to the printer 20 via a tube 210 which is connected to an ink container 200 containing the ink 5 would be acceptable. That is, either ink relay cartridges 100 like those in the preceding embodiments, or an attachment 100*f* like that in the present modified embodiment, would be acceptable.

While the present invention has been shown herein in terms of certain preferred embodiments and modified embodiments, the present invention is not limited to these embodiments and their modifications, and may be embodied in various modes without departing from the spirit thereof.

While the liquid container pertaining to the invention have been shown and described on the basis of the embodiment and variation, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A mountable apparatus adapted for installation in a liquid jetting device, the mountable apparatus adapted to receive liquid from a liquid container via a liquid delivery tube for jetting by the liquid jetting device, the liquid jetting device including a detection device which becomes electrically connected to the mountable apparatus when the mountable apparatus is mounted in the liquid jetting device, the detection device capable of being in an installed state signifying that the mountable apparatus is installed in the liquid jetting device and in a non-installed state signifying that the mountable apparatus is not installed in the liquid jetting device, the mountable apparatus, comprising:

a controller having an installation status notifier portion that when the mountable apparatus is installed in the liquid jetting device, is adapted to be able to selectively notify the liquid jetting device that there exists the installed state of the mountable apparatus installed therein, and additionally, to selectively notify the liquid jetting device, even in the installed state, that there exists a non-installed state signifying that the mountable apparatus is not installed in the liquid jetting device;

a memory device adapted to allow the liquid jetting device to read and write liquid information relating to the liquid while the installation status notifier portion notifies the liquid jetting device that the mountable apparatus is in the installed state; and the controller also comprising an information rewriting portion that is adapted to rewrite the liquid information in the memory device independently of a read or write operation by the liquid jetting device, wherein the installation status notifier portion is adapted to cause the liquid jetting device to determine that there exists the non-installed state while the information rewriting portion is rewriting the liquid information.

2. The mountable apparatus in accordance with claim 1, wherein the memory is adapted to allow the liquid jetting device to read and write liquid information relating to the liquid while in the installed state; and the information rewriting portion is adapted to rewrite the liquid information in the memory while the installation status notifier portion is notifying the liquid jetting device that there exists the non-installed state.

3. The mountable apparatus in accordance with claim 1, further comprising:

a determination use terminal adapted to electrically connect to the liquid jetting device in the installed state, and to be used by the liquid jetting device to determine whether there exists the installed state or the non-installed state;

wherein the installation status notifier portion is adapted to notify the liquid jetting device that there exists the non-installed state by bringing the determination use terminal to a high-impedance state.

4. The mountable apparatus in accordance with claim 3, wherein the determination use terminal includes an input terminal contact portion and an output terminal contact portion and the input terminal contact portion is adapted to receive from the liquid jetting device an input signal for determining whether there exists the installed state or the non-installed state; and the output terminal contact portion is adapted to output in response to the input signal, a response signal indicating that there exists the installed state, and the installation status notifier portion is adapted to notify the liquid jetting device that there exists the non-installed state by bringing at least either one of the input terminal contact portion and the output terminal contact portion to a high-impedance state.

5. The mountable apparatus in accordance with claim 1, further comprising:

a determination use terminal adapted to electrically connect to the liquid jetting device in the installed state, and to be used by the liquid jetting device to determine whether there exists the installed state or not;

wherein the installation status notifier portion is adapted to notify the liquid jetting device that there exists the non-installed state by outputting a signal indicating the non-installed state via the determination use terminal.

6. The mountable apparatus in accordance with claim 5, wherein the determination use terminal includes an input terminal contact portion and an output terminal contact portion, and the input terminal contact portion is adapted to receive from the liquid jetting device an input signal for determining whether the installed state exists or not; and the output terminal contact portion is adapted to output in response to the input signal a response signal indicating that there exists the installed state; and the installation status notifier portion is adapted to notify the liquid jetting device that there exists the non-installed state by outputting from the output terminal contact portion a signal indicating the non-installed state, instead of the response signal.

7. The mountable apparatus in accordance with claim 1, further comprising:

a first terminal adapted to electrically connect to the liquid jetting device in the installed state, wherein the detection device of the liquid jetting device is adapted to be in the installed state or the non-installed state, depending on whether the potential on the first terminal is a prescribed potential or not.

8. The mountable apparatus in accordance with claim 7, further comprising:

a second terminal and the installation status notifier portion is adapted such that in the installed state the second terminal is supplied with the prescribed potential; and wherein the installation status notifier portion is a first switching portion that is adapted to switch a connection of the first terminal and the second terminal between a state of continuity and a state of non-continuity.

9. The mountable apparatus in accordance with claim 1, further comprising:

an operation receiving portion that is adapted to receive operations by a user, wherein the information rewriting portion is adapted to rewrite the liquid information when operations by a user have been received.

10. The mountable apparatus in accordance with claim 1, wherein the information rewriting portion is adapted to rewrite the liquid information when a value of the liquid information has met a prescribed condition.

11. The mountable apparatus in accordance with claim 1, wherein the information rewriting portion is adapted to rewrite the liquid information when an update count by the liquid jetting device of the liquid information stored in the memory exceeds a prescribed count.

12. The mountable apparatus in accordance with claim 1, wherein the liquid information includes consumption information identifying a consumed amount of the liquid.

13. The mountable apparatus in accordance with claim 1, wherein the memory is adapted to allow the liquid jetting device to read and write liquid information relating to the liquid while in the installed state; and the information rewriting portion is adapted to rewrite the liquid information in the memory independently of a read or write operation by the liquid jetting device, wherein the installation status notifier portion is adapted to make the liquid jetting device acknowledge the non-installed state during a prescribed time interval that includes an interval in which the information rewriting portion is rewriting the liquid information.

14. The mountable apparatus in accordance with claim 8, further comprising:

a supply hole situated on one side of the mountable apparatus, for supplying the liquid to the liquid jetting device;

wherein the operation receiving portion is disposed to an opposite side from the one side of the mountable apparatus.

15. A board for mounting on a mountable apparatus that is adapted for installation in a liquid jetting device, the mountable apparatus adapted to receive liquid from a liquid container via a liquid delivery tube for jetting by the liquid jetting device, the liquid jetting device including a detection device which becomes electrically connected to the board when the board is mounted in the liquid jetting device, the detection device capable of being in an installed state, the installed state signifying that the mountable apparatus is installed in the liquid jetting device and in a non-installed state signifying that the mountable apparatus is not installed in the liquid jetting device, the board comprising:

a controller having an installation status notifier portion that when the mountable apparatus is installed in the liquid jetting device, is adapted to be able to selectively notify the liquid jetting device that there exists the installed state of the mountable apparatus installed therein, and additionally, to selectively notify the liquid jetting device, even in the installed state, that there exists a non-installed state signifying that the mountable apparatus is not installed in the liquid jetting device;

a memory device adapted to allow the liquid jetting device to read and write liquid information relating to the liquid while the installation status notifier portion notifies the liquid jetting device that the mountable apparatus is in the installed state; and the controller also comprising an information rewriting portion that is adapted to rewrite the liquid information in the memory device independently of a read or write operation by the liquid jetting device, wherein the installation status notifier portion is adapted to cause the liquid jetting device to determine that there exists the non-installed state while the information rewriting portion is rewriting the liquid information.

* * * * *